(12) United States Patent
Shim

(10) Patent No.: US 7,601,090 B2
(45) Date of Patent: Oct. 13, 2009

(54) POWER TRAIN OF AUTOMATIC TRANSMISSION

(75) Inventor: Hyu Tae Shim, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 422 days.

(21) Appl. No.: 11/641,464

(22) Filed: Dec. 19, 2006

(65) Prior Publication Data
US 2008/0108473 A1    May 8, 2008

(30) Foreign Application Priority Data
Nov. 6, 2006    (KR) ...................... 10-2006-0109095

(51) Int. Cl.
*F16H 3/62*    (2006.01)
(52) U.S. Cl. ..................................... 475/276
(58) Field of Classification Search .................. None
See application file for complete search history.

(56) References Cited

U.S. PATENT DOCUMENTS

| 7,311,635 | B2 * | 12/2007 | Klemen | 475/286 |
| 2008/0039267 | A1 * | 2/2008 | Shim | 475/280 |
| 2008/0146392 | A1 * | 6/2008 | Shim | 475/43 |

* cited by examiner

*Primary Examiner*—Dirk Wright
(74) *Attorney, Agent, or Firm*—Morgan, Lewis & Bockius LLP

(57) ABSTRACT

A power train for an automatic transmission provides seven forward speeds and three reverse speeds. The powertrain includes an input shaft; an output gear; a transmission case; a speed shift unit; an output unit and a series of brakes and clutches for sequentially stopping and connecting input and output members of the powertrain for realizing the respective speeds.

129 Claims, 22 Drawing Sheets

FIG. 21

| shift speed | C1 | C2 | C3 | C4 | B1 | B2 | speed ratio | step ratio |
|---|---|---|---|---|---|---|---|---|
| D1 | ● | | | | ● | | 5.42 | |
| D2 | | ● | | | ● | | 3.30 | 1.64 |
| D3 | | | ● | | ● | | 2.17 | 1.52 |
| D4 | | | | ● | ● | | 1.54 | 1.41 |
| D5 | | | ● | ● | | | 1.19 | 1.29 |
| D6 | | ● | | ● | | | 1.00 | 1.19 |
| D7 | ● | | | ● | | | 0.89 | 1.12 |
| REV. 1 | ● | | | | | ● | -5.35 | |
| REV. 2 | | ● | | | | ● | -23.26 | 6.07 |
| REV. 3 | | | ● | | | ● | -2.14 | |

Zr1/Zs1=1.52, Zr2/Zs2=2, Zr3/Zs3=1.89, Zr4/Zs4=3.36

POWER TRAIN OF AUTOMATIC TRANSMISSION

CROSS-REFERENCE TO RELATED APPLICATION

This application claims priority to and the benefit of Korean Patent Application No. 10-2006-0109095 filed in the Korean Intellectual Property Office on Nov. 6, 2006, the entire contents of which are incorporated herein by reference.

BACKGROUND OF THE INVENTION (a) Field of the Invention

The present invention relates to a power train of an automatic transmission. More particularly, the present invention relates to a power train of an automatic transmission that realizes seven forward speeds and three reverse speeds.

(b) Description of the Related Art

A typical shift mechanism of an automatic transmission utilizes a combination of a plurality of planetary gear sets. A power train of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a power train such as durability, efficiency in power transmission, and size depend a lot on the layout of combined planetary gear sets. Therefore, designs for a combining structure of a power train are also under constant investigation.

A manual transmission that has too many speeds causes the inconvenience of excessively frequent shifting operations to a driver. Therefore, the positive features of more shift-speeds are more important for automatic transmissions because an automatic transmission automatically controls shifting operations basically without needing any manual operation.

As more speeds in an automatic transmission are realized, a power train that can easily skip up-shift and skip down-shift as well as normally up-shift and down-shift is required.

The above information disclosed in this Background section is only for enhancement of understanding of the background of the invention and therefore it may contain information that does not form the prior art that is already known in this country to a person of ordinary skill in the art.

SUMMARY OF THE INVENTION

Embodiments of the present invention provide a power train for an automatic transmission have advantages associated with seven forward speeds and three reverse speeds and facilitate a skip up-shifting and skip sown-shifting.

Exemplary power trains of an automatic transmission according to embodiments of the present invention may include: an input shaft; an output gear; a transmission case; a speed shift unit comprising a fixed input member that is fixedly connected to the input shaft, a fixedly stopped member that is fixedly connected to the transmission case, an increased speed output member that outputs an increased rotational speed, and a reduced speed output member that outputs a reduced rotational speed; an output unit comprising a variable input member that is variably connected to the input shaft, the increased speed output member, and the reduced speed output member, a variable input/stopped member that is variably connected to the input shaft or is variably connected to the transmission case, a variably stopped member that is variably connected to the transmission case, and a shift speed output member that always acts as an output member by being fixedly connected to the output gear, wherein the output unit generates seven forward speeds and three reverse speeds at the shift speed output member by operations of the variable input member, the variable input/stopped member, and the variably stopped member; a first clutch for variably connecting the variable input member to the reduced speed output member; a second clutch for variably connecting the variable input member to the input shaft; a third clutch for variably connecting the variable input member to the increased speed output member; a fourth clutch for variably connecting the variable input/stopped member to the input shaft; a first brake for variably stopping the variably stopped member; and a second brake for variably stopping the variable input/stopped member.

According to a first exemplary embodiment of the present invention, the speed shift unit may include: a first planetary gear set having a first sun gear, a first planet carrier, and a first ring gear as operational members thereof; and a second planetary gear set having a second sun gear, a second planet carrier, and a second ring gear as operational members thereof, wherein the first ring gear is fixedly connected to the second planet carrier, the first sun gear is fixedly connected to the second sun gear, at least one of the fixedly connected first ring gear and the second planet carrier is operated as the fixed input member, at least one of the fixedly connected first sun gear and the second sun gear is operated as the fixedly stopped member, the first planet carrier is operated as the reduced speed output member, and the second ring gear is operated as the increased speed output member.

The output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third ring gear is fixedly connected to the fourth planet carrier, the third planet carrier is fixedly connected to the fourth ring gear, the third sun gear is operated as the variable input member, at least one of the fixedly connected third planet carrier and the fourth ring gear is operated as the variable input/stopped member, the fourth sun gear is operated as the variably stopped member, and at least one of the fixedly connected third ring gear and the fourth planet carrier is operated as the shift speed output member.

The first clutch may be disposed on an opposite side to the output unit with reference to the speed shift unit.

The second, third, and fourth clutches may be disposed between the speed shift unit and the output unit.

The first brake may be disposed on an opposite side to the speed shift unit with reference to the output unit.

The first, second, third, and fourth planetary gear sets may be dispose in a sequence of the first planetary gear set, the second planetary gear set, the third planetary gear set, and the fourth planetary gear set.

According to a second exemplary embodiment of the present invention, the speed shift unit may include a Ravigneaux planetary gear set having a long-pinion-side sun gear, a short-pinion-side sun gear, a Ravigneaux planet carrier, and a Ravigneaux ring gear as operational members thereof, wherein the Ravigneaux ring gear is operated as the fixed input member, the long-pinion-side sun gear is operated as the fixedly stopped member, the Ravigneaux planet carrier is operated as the reduced speed output member, and the short-pinion-side sun gear is operated as the increased speed output member.

The output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first ring gear is fixedly connected to the second planet carrier, the first planet carrier is fixedly connected to the second ring gear, the first ring gear is operated as the variable input member, at least one of the fixedly connected first planet carrier and the second ring gear is operated as the variable input/stopped member, the second sun gear is operated as the variably stopped member, and at least one of the fixedly connected first ring gear and the second planet carrier is operated as the shift speed output member.

The first and third clutches may be disposed on an opposite side to the output unit with reference to the speed shift unit.

The second and fourth clutches may be disposed between the speed shift unit and the output unit.

The first brake may be disposed on an opposite side to the speed shift unit with reference to the output unit.

The Ravigneaux planetary gear set and the first and second planetary gear sets may be disposed in a sequence of the Ravigneaux planetary gear set, the first planetary gear set, and the second planetary gear set.

According to a third exemplary embodiment of the present invention, the speed shift unit may include a compound planetary gear set having a short-pinion-side ring gear, a long-pinion-side ring gear, a compound planet carrier, and a compound sun gear as operational members thereof, wherein the compound planet carrier is operated as the fixed input member, the compound sun gear is operated as the fixedly stopped member, the short-pinion-side ring gear is operated as the reduced speed output member, and the long-pinion-side ring gear is operated as the increased speed output member.

The output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first ring gear is fixedly connected to the second planet carrier, the first planet carrier is fixedly connected to the second ring gear, the first sun gear is operated as the variable input member, at least one of the fixedly connected first planet carrier and the second ring gear is operated as the variable input/stopped member, the second sun gear is operated as the variably stopped member, and at least one of the fixedly connected first ring gear and the second planet carrier is operated as the shift speed output member.

The first clutch may be disposed on an opposite side to the output unit with reference to the speed shift unit.

The second, third, and fourth clutches may be disposed between the speed shift unit and the output unit.

The first brake may be disposed on an opposite side to the speed shift unit with reference to the output unit.

The compound planetary gear set and the first and second planetary gear sets may be disposed in a sequence of the compound planetary gear set, the first planetary gear set, and the second planetary gear set.

According to a fourth exemplary embodiment of the present invention, the speed shift unit may include: a first planetary gear set having a first sun gear, a first planet carrier, and a first ring gear as operational members thereof; and a second planetary gear set having a second sun gear, a second planet carrier, and a second ring gear as operational members thereof, wherein the first planet carrier is fixedly connected to the second planet carrier, the first sun gear is fixedly connected to the second sun gear, the second ring gear is operated as the fixed input member, at least one of the fixedly connected first sun gear and the second sun gear is operated as the fixedly stopped member, at least one of the fixedly connected first planet carrier and the second planet carrier is operated as the reduced speed output member, and the first ring gear is operated as the increased speed output member.

The output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third ring gear is fixedly connected to the fourth planet carrier, the third planet carrier is fixedly connected to the fourth ring gear, the third sun gear is operated as the variable input member, at least one of the fixedly connected third planet carrier and the fourth ring gear is operated as the variable input/stopped member, the fourth sun gear is operated as the variably stopped member, and at least one of the fixedly connected third ring gear and the fourth planet carrier is operated as the shift speed output member.

The first and third clutches may be disposed on an opposite side to the output unit with reference to the speed shift unit.

The second and fourth clutches may be disposed between the speed shift unit and the output unit.

The first brake may be disposed on an opposite side to the speed shift unit with reference to the output unit.

The first, second, third, and fourth planetary gear sets may be disposed in a sequence of the first planetary gear set, the second planetary gear set, the third planetary gear set, and the fourth planetary gear set.

According to a fifth exemplary embodiment of the present invention, the speed shift unit is the same as the speed shift unit of the first exemplary embodiment of the present invention.

According to the fifth exemplary embodiment of the present invention, the output unit may include a Ravigneaux planetary gear set having a long-pinion-side sun gear, a short-pinion-side sun gear, a Ravigneaux planet carrier, and a Ravigneaux ring gear as operational members thereof, wherein the long-pinion-side sun gear is operated as the variable input member, the Ravigneaux planet carrier is operated as the variable input/stopped member, the short-pinion-side sun gear is operated as the variably stopped member, and the Ravigneaux ring gear is operated as the shift speed output member.

The first clutch may be disposed on an opposite side to the output unit with reference to the speed shift unit.

The second, third, and fourth clutches may be disposed between the speed shift unit and the output unit.

The first and second brakes may be disposed between the speed shift unit and the output unit.

The first and second planetary gear sets and the Ravigneaux planetary gear set may be disposed in a sequence of the first planetary gear set, the second planetary gear set, and the Ravigneaux planetary gear set.

According to a sixth exemplary embodiment of the present invention, the speed shift unit is the same as the speed shift unit of the fourth exemplary embodiment of the present invention.

According to the sixth exemplary embodiment of the present invention, the output unit may include a Ravigneaux planetary gear set having a long-pinion-side sun gear, a short-pinion-side sun gear, a Ravigneaux planet carrier, and a Ravigneaux ring gear as operational members thereof, wherein the long-pinion-side sun gear is operated as the variable input member, the Ravigneaux planet carrier is operated as the variable input/stopped member, the short-pinion-side sun gear is operated as the variably stopped member, the Ravigneaux ring gear is operated as the shift speed output member.

The first and third clutches may be disposed on an opposite side to the output unit with reference to the speed shift unit.

The second and fourth clutches may be disposed between the speed shift unit and the output unit.

The first and second brakes may be disposed between the speed shift unit and the output unit.

The first and second planetary gear sets and the Ravigneaux planetary gear set may be disposed in a sequence of the first planetary gear set, the second planetary gear set, and the Ravigneaux planetary gear set.

According to a seventh exemplary embodiment of the present invention, the speed shift unit is the same as the speed shift unit of the fourth exemplary embodiment of the present invention.

According to the seventh exemplary embodiment of the present invention, the output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is fixedly connected to the fourth sun gear, the third planet carrier is fixedly connected to the fourth ring gear, the third ring gear is operated as the variable input member, at least one of the fixedly connected third planet carrier and the fourth ring gear is operated as the variable input/stopped member, at least one of the fixedly connected third sun gear and the fourth sun gear is operated as the variably stopped member, and the fourth planet carrier is operated as the shift speed output member.

The first and third clutches may be disposed on an opposite side to the output unit with reference to the speed shift unit.

The second and fourth clutches may be disposed between the speed shift unit and the output unit.

The first and second brakes may be disposed between the third planetary gear set and the fourth planetary gear set.

The first, second, third, and fourth planetary gear sets may be disposed in a sequence of the first planetary gear set, the second planetary gear set, the third planetary gear set, and the fourth planetary gear set.

According to a eighth exemplary embodiment of the present invention, the speed shift unit is the same as the speed shift unit of the first exemplary embodiment of the present invention.

According to the eighth exemplary embodiment of the present invention, the output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is fixedly connected to the fourth sun gear, the third planet carrier is fixedly connected to the fourth planet carrier, at least one of the fixedly connected third sun gear and the fourth sun gear is operated as the variable input member, at least one of the fixedly connected third planet carrier and the fourth planet carrier is operated as the variable input/stopped member, the third ring gear is operated as the variably stopped member, and the fourth ring gear is operated as the shift speed output member.

The first clutch may be disposed on an opposite side to the output unit with reference to the speed shift unit.

The second, third, and fourth clutches may be disposed between the speed shift unit and the output unit.

The second brake may be disposed between the speed shift unit and the output unit.

The first, second, third, and fourth planetary gear sets may be disposed in a sequence of the first planetary gear set, the second planetary gear set, the third planetary gear set, and the fourth planetary gear set.

According to a ninth exemplary embodiment of the present invention, the speed shift unit may include: a first planetary gear set having a first sun gear, a first planet carrier, and a first ring gear as operational members thereof; and a second planetary gear set having a second sun gear, a second planet carrier, and a second ring gear as operational members thereof, wherein the first ring gear is fixedly connected to the second planet carrier, the first planet carrier is fixedly connected to the second ring gear, at least one of the fixedly connected first ring gear and the second planet carrier is operated as the fixed input member, the first sun gear is operated as the fixedly stopped member, at least one of the fixedly connected first planet carrier and the second ring gear is operated as the reduced speed output member, and the second sun gear is operated as the increased speed output member.

The output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is fixedly connected to the fourth sun gear, the third planet carrier is fixedly connected to the fourth planet carrier, at least one of the fixedly connected third sun gear and the fourth sun gear is operated as the variable input member, at least one of the fixedly connected third planet carrier and the fourth planet carrier is operated as the variable input/stopped member, the third ring gear is operated as the variably stopped member, and the fourth ring gear is operated as the shift speed output member.

The first clutch may be disposed on an opposite side to the output unit with reference to the speed shift unit.

The second, third, and fourth clutches may be disposed between the speed shift unit and the output unit.

The second brake may be disposed between the speed shift unit and the output unit.

The first, second, third, and fourth planetary gear sets may be disposed in a sequence of the first planetary gear set, the second planetary gear set, the third planetary gear set, and the fourth planetary gear set.

According to a tenth exemplary embodiment of the present invention, the speed shift unit is the same as the speed shift unit of the fourth exemplary embodiment of the present invention.

According to the tenth exemplary embodiment of the present invention, the output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is fixedly connected to the fourth sun gear, the third planet carrier is fixedly connected to the fourth planet carrier, at least one of the fixedly connected third sun gear and the fourth sun gear is operated as the variable input member, at least one of the fixedly connected third planet carrier and the fourth planet carrier is operated as the variable input/stopped member, the third ring gear is operated as the variably stopped member, and the fourth ring gear is operated as the shift speed output member.

The first and third clutches may be disposed on an opposite side to the output unit with reference to the speed shift unit.

The second and fourth clutches may be disposed between the speed shift unit and the output unit.

The second brake may be disposed between the speed shift unit and the output unit.

The first, second, third, and fourth planetary gear sets may be disposed in a sequence of the first planetary gear set, the second planetary gear set, the third planetary gear set, and the fourth planetary gear set.

According to a eleventh exemplary embodiment of the present invention, the speed shift unit may include a Ravigneaux planetary gear set having a long-pinion-side sun gear, a short-pinion-side sun gear, a Ravigneaux planet carrier, and a Ravigneaux ring gear as operational members thereof, wherein the Ravigneaux planet carrier is operated as the fixed input member, the short-pinion-side sun gear is operated as the fixedly stopped member, the Ravigneaux ring gear is operated as the reduced speed output member, and the long-pinion-side sun gear is operated as the increased speed output member.

The output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first sun gear is fixedly connected to the second sun gear, the first planet carrier is fixedly connected to the second planet carrier, at least one of the fixedly connected first sun gear and the second sun gear is operated as the variable input member, at least one of the fixedly connected first planet carrier and the second planet carrier is operated as the variable input/stopped member, the first ring gear is operated as the variably stopped member, and the second ring gear is operated as the shift speed output member.

The first clutch may be disposed on an opposite side to the output unit with reference to the speed shift unit.

The second, third, and fourth clutches may be disposed between the speed shift unit and the output unit.

The second brake may be disposed between the speed shift unit and the output unit.

The Ravigneaux planetary gear set and the first and second planetary gear sets may be disposed in a sequence of the Ravigneaux planetary gear set, the first planetary gear set, and the second planetary gear set.

According to a twelfth exemplary embodiment of the present invention, the speed shift unit is the same as the speed shift unit of the third exemplary embodiment of the present invention.

According to the twelfth exemplary embodiment of the present invention, the output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first sun gear is fixedly connected to the second sun gear, the first planet carrier is fixedly connected to the second planet carrier, at least one of the fixedly connected first sun gear and the second sun gear is operated as the variable input member, at least one of the fixedly connected first planet carrier and the second planet carrier is operated as the variable input/stopped member, the first ring gear is operated as the variably stopped member, and the second ring gear is operated as the shift speed output member.

The first clutch may be disposed on an opposite side to the output unit with reference to the speed shift unit.

The second, third, and fourth clutches may be disposed between the speed shift unit and the output unit.

The second brake may be disposed between the speed shift unit and the output unit.

The compound planetary gear set and the first and second planetary gear sets may be disposed in a sequence of the compound planetary gear set, the first planetary gear set, and the second planetary gear set.

According to a thirteenth exemplary embodiment of the present invention, the speed shift unit is the same as the speed shift unit of the ninth exemplary embodiment of the present invention.

According to the thirteenth exemplary embodiment of the present invention, the output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third ring gear is fixedly connected to the fourth planet carrier, the third planet carrier is fixedly connected to the fourth ring gear, the third sun gear is operated as the variable input member, at least one of the fixedly connected third planet carrier and the fourth ring gear is operated as the variable input/stopped member, the fourth sun gear is operated as the variably stopped member, and at least one of the fixedly connected third ring gear and the fourth planet carrier is operated as the shift speed output member.

The first clutch may be disposed on an opposite side to the output unit with reference to the speed shift unit.

The second, third, and fourth clutches may be disposed between the speed shift unit and the output unit.

The first brake may be disposed on an opposite side to the speed shift unit with reference to the output unit.

The first, second, third, and fourth planetary gear sets may be disposed in a sequence of the first planetary gear set, the second planetary gear set, the third planetary gear set, and the fourth planetary gear set.

According to a fourteenth exemplary embodiment of the present invention, the speed shift unit is the same as the speed shift unit of the ninth exemplary embodiment of the present invention.

According to the fourteenth exemplary embodiment of the present invention, the output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is fixedly connected to the fourth sun gear, the third planet carrier is fixedly connected to the fourth ring gear, the third ring gear is operated as the variable input member, at least one of the fixedly connected third planet carrier and the fourth ring gear is operated as the variable input/stopped member, at least one of the fixedly connected third sun gear and the fourth sun gear is operated as the variably stopped member, and the fourth planet carrier is operated as the shift speed output member.

The first clutch may be disposed on an opposite side to the output unit with reference to the speed shift unit.

The second, third, and fourth clutches may be disposed between the speed shift unit and the output unit.

The first and second brakes may be disposed between the third planetary gear set and the fourth planetary gear set.

The first, second, third, and fourth planetary gear sets may be disposed in a sequence of the first planetary gear set, the second planetary gear set, the third planetary gear set, and the fourth planetary gear set.

According to a fifteenth exemplary embodiment of the present invention, the speed shift unit is the same as the speed shift unit of the eleventh exemplary embodiment of the present invention.

According to the fifteenth exemplary embodiment of the present invention, the output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first sun gear is fixedly connected to the second sun gear, the first planet carrier is fixedly connected to the second ring gear, the first ring gear is operated as the variable input member, at least one of the fixedly connected first planet carrier and the second ring gear is operated as the variable input/stopped member, at least one of the fixedly connected first sun gear and the second sun gear is operated as the variably stopped member, and the second planet carrier is operated as the shift speed output member.

The first clutch may be disposed on an opposite side to the output unit with reference to the speed shift unit.

The second, third, and fourth clutches may be disposed between the speed shift unit and the output unit.

The first and second brakes may be disposed between the first planetary gear set and the second planetary gear set.

The Ravigneaux planetary gear set and the first and second planetary gear sets may be disposed in a sequence of the Ravigneaux planetary gear set, the first planetary gear set, and the second planetary gear set.

According to a sixteenth exemplary embodiment of the present invention, the speed shift unit is the same as the speed shift unit of the third exemplary embodiment of the present invention.

According to the sixteenth exemplary embodiment of the present invention, the output unit may include: a first planetary gear set having a first sun gear, a first planet carrier, and a first ring gear as operational members thereof; and a second planetary gear set having a second sun gear, a second planet carrier, and a second ring gear as operational members thereof, wherein the first sun gear is fixedly connected to the second sun gear, the first planet carrier is fixedly connected to the second ring gear, the first ring gear is operated as the variable input member, at least one of the fixedly connected first planet carrier and the second ring gear is operated as the variable input/stopped member, at least one of the fixedly connected first sun gear and the second sun gear is operated as the variably stopped member, and the second planet carrier is operated as the shift speed output member.

The first clutch may be disposed on an opposite side to the output unit with reference to the speed shift unit.

The second, third, and fourth clutches may be disposed between the speed shift unit and the output unit.

The first and second brakes may be disposed between the first planetary gear set and the second planetary gear set.

The compound planetary gear set and the first and second planetary gear sets may be disposed in a sequence of the compound planetary gear set, the first planetary gear set, and the second planetary gear set.

According to a seventeenth exemplary embodiment of the present invention, the speed shift unit is the same as the speed shift unit of the first exemplary embodiment of the present invention.

According to the seventeenth exemplary embodiment of the present invention, the output unit may include: a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is fixedly connected to the fourth sun gear, the third planet carrier is fixedly connected to the fourth ring gear, the third ring gear is operated as the variable input member, at least one of the fixedly connected third planet carrier and the fourth ring gear is operated as the variable input/stopped member, at least one of the fixedly connected third sun gear and the fourth sun gear is operated as the variably stopped member, and the fourth planet carrier is operated as the shift speed output member.

The first clutch may be disposed on an opposite side to the output unit with reference to the speed shift unit.

The second, third, and fourth clutches may be disposed between the speed shift unit and the output unit.

The first and second brakes may be disposed between the third planetary gear set and the fourth planetary gear set.

The first, second, third, and fourth planetary gear sets may be disposed in a sequence of the first planetary gear set, the second planetary gear set, the third planetary gear set, and the fourth planetary gear set.

According to a eighteenth exemplary embodiment of the present invention, the speed shift unit is the same as the speed shift unit of the ninth exemplary embodiment of the present invention.

According to the eighteenth exemplary embodiment of the present invention, the output unit may include a Ravigneaux planetary gear set having a long-pinion-side sun gear, a short-pinion-side sun gear, a Ravigneaux planet carrier, and a Ravigneaux ring gear as operational members thereof, wherein the long-pinion-side sun gear is operated as the variable input member, the Ravigneaux planet carrier is operated as the variable input/stopped member, the short-pinion-side sun gear is operated as the variably stopped member, and the Ravigneaux ring gear is operated as the shift speed output member.

The first clutch may be disposed on an opposite side to the output unit with reference to the speed shift unit.

The second, third, and fourth clutches may be disposed between the speed shift unit and the output unit.

The first and second brakes may be disposed between the speed shift unit and the output unit.

The first and second planetary gear sets and the Ravigneaux planetary gear set may be disposed in a sequence of the first planetary gear set, the second planetary gear set, and the Ravigneaux planetary gear set.

According to a nineteenth exemplary embodiment of the present invention, the speed shift unit may include a first Ravigneaux planetary gear set having a first long-pinion-side sun gear, a first short-pinion-side sun gear, a first Ravigneaux planet carrier, and a first Ravigneaux ring gear as operational members thereof, wherein the first Ravigneaux planet carrier is operated as the fixed input member, the first short-pinion-side sun gear is operated as the fixedly stopped member, the first Ravigneaux ring gear is operated as the reduced speed output member, and the first long-pinion-side sun gear is operated as the increased speed output member.

The output unit may include a second Ravigneaux planetary gear set having a second long-pinion-side sun gear, a second short-pinion-side sun gear, a second Ravigneaux planet carrier, and a second Ravigneaux ring gear as operational members thereof, wherein the second long-pinion-side sun gear is operated as the variable input member, the second Ravigneaux planet carrier is operated as the variable input/stopped member, the second short-pinion-side sun gear is operated as the variably stopped member, and the second Ravigneaux ring gear is operated as the shift speed output member.

The first clutch may be disposed on an opposite side to the output unit with reference to the speed shift unit.

The second, third, and fourth clutches may be disposed between the speed shift unit and the output unit.

The first and second brakes may be disposed between the speed shift unit and the output unit.

The first and second Ravigneaux planetary gear sets may be disposed in a sequence of the first Ravigneaux planetary gear set and the second Ravigneaux planetary gear set.

According to a twentieth exemplary embodiment of the present invention, the speed shift unit may include a compound planetary gear set having a long-pinion-side ring gear, a short-pinion-side ring gear, a compound planet carrier, and a compound sun gear as operational members thereof, wherein the compound planet carrier is operated as the fixed input member, the compound sun gear is operated as the fixedly stopped member, the short-pinion-side ring gear is operated as the reduced speed output member, and the long-pinion-side ring gear is operated as the increased speed output member.

The output unit may include a Ravigneaux planetary gear set having a long-pinion-side sun gear, a short-pinion-side sun gear, a Ravigneaux planet carrier, and a Ravigneaux ring gear as operational members thereof, wherein the long-pinion-side sun gear is operated as the variable input member, the Ravigneaux planet carrier is operated as the variable input/stopped member, the short-pinion-side sun gear is operated as the variably stopped member, and the Ravigneaux ring gear is operated as the shift speed output member.

The first clutch may be disposed on an opposite side to the output unit with reference to the speed shift unit.

The second, third, and fourth clutches may be disposed between the speed shift unit and the output unit.

The first and second brakes may be disposed between the speed shift unit and the output unit.

The compound planetary gear set and the Ravigneaux planetary gear set may be disposed in a sequence of the compound planetary gear set and the Ravigneaux planetary gear set.

According to exemplary embodiments of the present invention, the first clutch and the first brake are operated in a first forward speed, the second clutch and the first brake are operated in a second forward speed, the third clutch and the first brake are operated in a third forward speed, the fourth clutch and the first brake are operated in a fourth forward speed, the third and fourth clutches are operated in a fifth forward speed, the second and fourth clutches are operated in a sixth forward speed, the first and fourth clutches are operated in a seventh forward speed, the first clutch and the second brake are operated in a first reverse speed, the second clutch and the second brake are operated in a second reverse speed, and the third clutch and the second brake are operated in a third reverse speed.

BRIEF DESCRIPTION OF THE DRAWINGS

FIG. 21 is an operational chart for a power train of an automatic transmission that realizes seven forward speeds and three reverse speeds according to exemplary embodiments of the present invention.

DETAILED DESCRIPTION OF THE EMBODIMENTS

Figure 1:
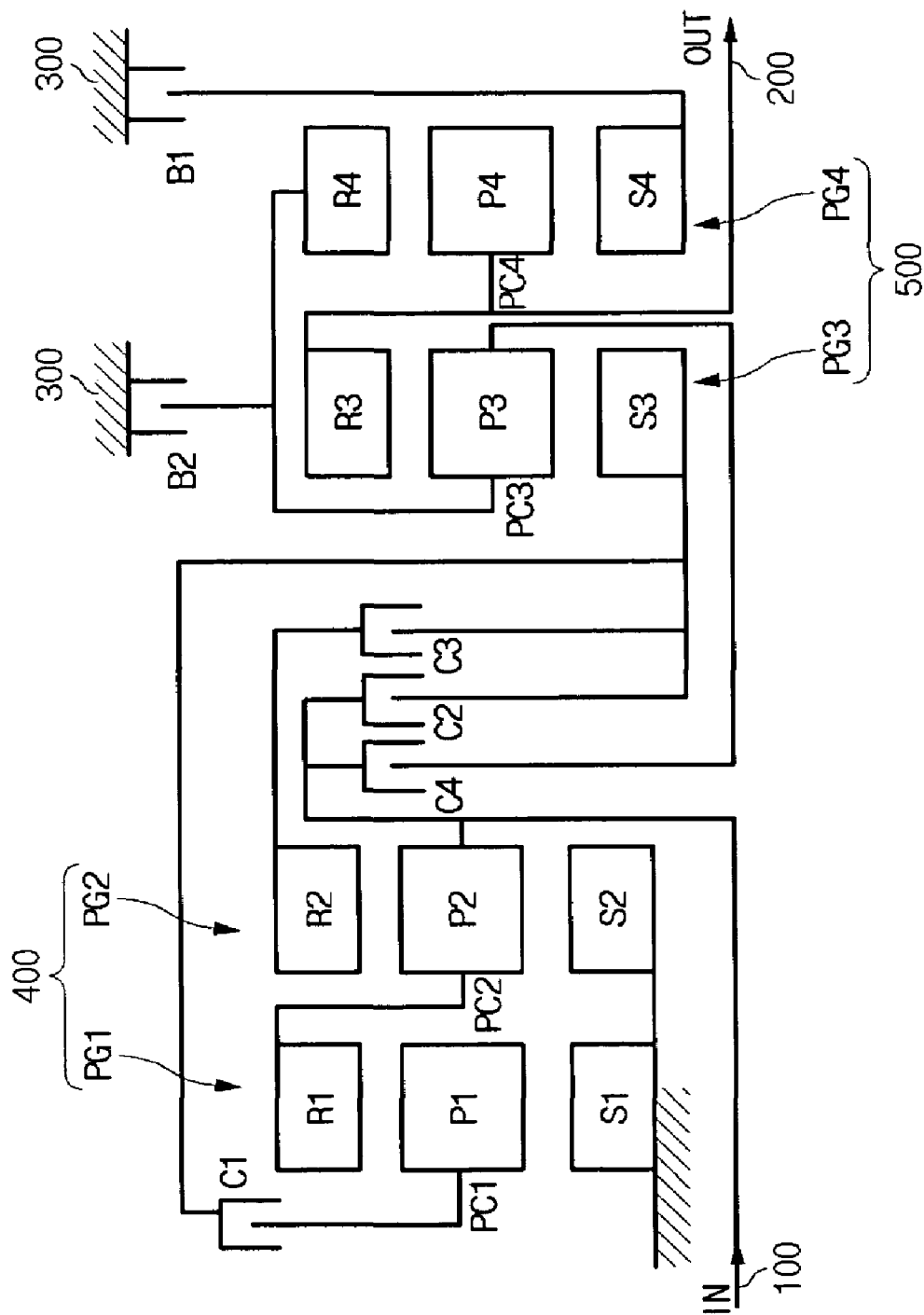
FIG. 1 is a schematic diagram of a power train of an automatic transmission according to a first exemplary embodiment of the present invention.

An exemplary embodiment of the present invention will hereinafter be described in detail with reference to the accompanying drawings.

As shown FIG. 1 to FIG. 20, exemplary power trains of an automatic transmission according to embodiments of the present invention include an input shaft 100, an output gear 200, a transmission case 300, a speed shift unit 400, and an output unit 500. The input shaft 100 receives torque from an engine (not shown). The output gear 200 outputs torque from the power train.

The speed shift unit 400 includes a fixed input member, a fixedly stopped member, an increased speed output member, and a reduced speed output member. The speed shift unit 400 generates an increased rotational speed that is larger than a rotational speed of the input shaft 100 at the increased speed output member and generates a reduced rotational speed that is smaller than the rotational speed of the input shaft 100 at the reduced speed output member by operations of the fixed input member and the fixedly stopped member.

The output unit 500 includes a variable input member, a variable input/stopped member, a variably stopped member, and a shift speed output member. The output unit 500 generates seven forward speeds and three reverse speeds at the shift speed output member by operations of the variable input member, the variable input/stopped member, and the variably stopped member.

In addition, exemplary power trains of an automatic transmission according to embodiments of the present invention include first, second, third, and fourth clutches C1, C2, C3, and C4 and first and second brakes B1 and B2.

The fixed input member acts as an input member by being fixedly connected to the input shaft 100. The fixedly stopped member is fixedly connected to the transmission case 300 and stops. In a preferred embodiment the fixed input number always acts as an input member and the fixedly stopped member always stops. Therefore, the increased rotational speed is generated at the increased speed output member and the reduced rotational speed is generated at the reduced speed output member by the operations of the fixed input member and the fixedly stopped member.

The variable input member is variably connected to the reduced speed output member via the first clutch C1, is variably connected to the input shaft 100 via the second clutch C2, and is variably connected to the increased speed output member via the third clutch C3. Therefore, the variable input member respectively receives the reduced rotational speed, the rotational speed of the input shaft 100, and the increased rotational speed by operations of the first, second, and third clutches C1, C2, and C3.

The variable input/stopped member is variably connected to the input shaft 100 via the fourth clutch C4. Therefore, the variable input/stopped member receives the rotational speed of the input shaft 100 by an operation of the fourth clutch C4. In addition, the variable input/stopped member is variably connected to the transmission case 300 via the second brake B2 and is subjected to a stopping operation of the second brake B2. The variably stopped member is variably connected to the transmission case 300 via the first brake B1 and is subjected to a stopping operation of the first brake B1. The shift speed output member always acts as an output member by being fixedly connected to the output gear 200.

Hereinafter, referring to FIG. 1, an exemplary power train of an automatic transmission according to the first embodiment of the present invention will be described in detail.

As shown in FIG. 1, according to the first exemplary embodiment of the present invention, the speed shift unit 400 includes first and second planetary gear sets PG1 and PG2, and the output unit 500 includes third and fourth planetary gear sets PG3 and PG4.

The first planetary gear set PG1 is a single pinion planetary gear set, and includes a first sun gear S1, a first planet carrier PC1, and a first ring gear R1 as operational members thereof. A first pinion gear P1, being engaged with both the first ring gear R1 and the first sun gear S1, is connected to and is carried by the first planet carrier PC1.

The second planetary gear set PG2 is a single pinion planetary gear set, and includes a second sun gear S2, a second planet carrier PC2, and a second ring gear R2 as operational members thereof. A second pinion gear P2, being engaged with both the second ring gear R2 and the second sun gear S2, is connected to and is carried by the second planet carrier PC2.

The third planetary gear set PG3 is a single pinion planetary gear set, and includes a third sun gear S3, a third planet carrier PC3, and a third ring gear R3 as operational members thereof. A third pinion gear P3, being engaged with both the third ring gear R3 and the third sun gear S3, is connected to and is carried by the third planet carrier PC3.

The fourth planetary gear set PG4 is a single pinion planetary gear set, and includes a fourth sun gear S4, a fourth planet carrier PC4, and a fourth ring gear R4 as operational members thereof. A fourth pinion gear P4, being engaged with both the fourth ring gear R4 and the fourth sun gear S4, is connected to and is carried by the fourth planet carrier PC4.

According to the first exemplary embodiment of the present invention, the first ring gear R1 is fixedly connected to the second planet carrier PC2, and the first sun gear S1 is fixedly connected to the second sun gear S2. In addition, at least one of the fixedly connected first ring gear R1 and the second planet carrier PC2 is operated as the fixed input member, at least one of the fixedly connected first sun gear S1 and the second sun gear S2 is operated as the fixedly stopped member, the first planet carrier PC1 is operated as the reduced speed output member, and the second ring gear R2 is operated as the increased speed output member.

According to the first exemplary embodiment of the present invention, the third ring gear R3 is fixedly connected to the fourth planet carrier PC4, and the third planet carrier PC3 is fixedly connected to the fourth ring gear R4. In addition, the third sun gear S3 is operated as the variable input member, at least one of the fixedly connected third planet carrier PC3 and the fourth ring gear R4 is operated as the variable input/stopped member, the fourth sun gear S4 is operated as the variably stopped member, and at least one of the fixedly connected third ring gear R3 and the fourth planet carrier PC4 is operated as the shift speed output member.

According to the first exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. The first brake B1 is disposed on an opposite side to the speed shift unit 400 with reference to the output unit 500.

In addition, the first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

Hereinafter, operation of a power train according to the first exemplary embodiment of the present invention will be described in detail.

As shown in FIG. 21, according to the first exemplary embodiment of the present invention, the first clutch C1 and the first brake B1 are operated in a first forward speed D1, the second clutch C2 and the first brake B1 are operated in a second forward speed D2, the third clutch C3 and the first brake B1 are operated in a third forward speed D3, the fourth clutch C4 and the first brake B1 are operated in a fourth forward speed D4, the third and fourth clutches C3 and C4 are operated in a fifth forward speed D5, the second and fourth clutches C2 and C4 are operated in a sixth forward speed D6, and the first and fourth clutches C1 and C4 are operated in a seventh forward speed D7.

In addition, the first clutch C1 and the second brake B2 are operated in a first reverse speed REV. 1, the second clutch C2 and the second brake B2 are operated in a second reverse speed REV. 2, and the third clutch C3 and the second brake B2 are operated in a third reverse speed REV. 3.

Hereinafter, up-shifting processes of the exemplary power train of an automatic transmission according to the first embodiment of the present invention will be described in detail.

In the shifting process from the first forward speed D1 to the second forward speed D2, the first clutch C1 is released, and the second clutch C2 is operated. In the shifting process from the second forward speed D2 to the third forward speed D3, the second clutch C2 is released, and the third clutch C3 is operated. In the shifting process from the third forward speed D3 to the fourth forward speed D4, the third clutch C3 is released, and the fourth clutch C4 is operated. In the shifting process from the fourth forward speed D4 to the fifth forward speed D5, the first brake B1 is released, and the third clutch C3 is operated. In the shifting process from the fifth forward speed D5 to the sixth forward speed D6, the third clutch C3 is released, and the second clutch C2 is operated. In the shifting process from the sixth forward speed D6 to the seventh forward speed D7, the second clutch C2 is released, and the first clutch C1 is operated. Down-shifting processes are reverse processes of the up-shifting processes according to the first exemplary embodiment of the present invention.

Hereinafter, skip down-shifting processes acording to the first exemplary embodiment of the present invention will be described in detail.

In a skip down-shifting process from the third forward speed D3 to the first forward speed D1, the third clutch C3 is released, and the first clutch C1 is operated.

In a skip down-shifting process from the fourth forward speed D4 to the second forward speed D2, the fourth clutch C4 is released, and the second clutch C2 is operated.

In a skip down-shifting process from the fourth forward speed D4 to the first forward speed D1, the fourth clutch C4 is released, and the first clutch C1 is operated. In a skip down-shifting process from the fifth forward speed D5 to the third forward speed D3, the fourth clutch C4 is released, and the first brake B1 is operated. In a skip down-shifting process from the fifth forward speed D5 to the second forward speed D2, 5→3 shifting and 3→2 shifting may be performed in sequence or 5→4 shifting and 4→2 shifting may be performed in sequence. In a skip down-shifting process from the sixth forward speed D6 to the fourth forward speed D4, the second clutch C2 is released, and the first brake B1 is operated. In a skip down-shifting process from the sixth forward speed D6 to the third forward speed D3, 6→5 shifting and 5→3 shifting may be performed in sequence or 6→4 shifting and 4Δ3 shifting may be performed in sequence. In a skip down-shifting process from the seventh forward speed D7 to the fifth forward speed D5, the first clutch C1 is released, and the third clutch C3 is operated. In a skip down-shifting process from the seventh forward speed D7 to the fourth forward speed D4, the first clutch C1 is released, and the first brake B1 is operated. Skip up-shifting processes are reverse processes of the skip down-shifting processes according to the first exemplary embodiment of the present invention.

Figure 22:
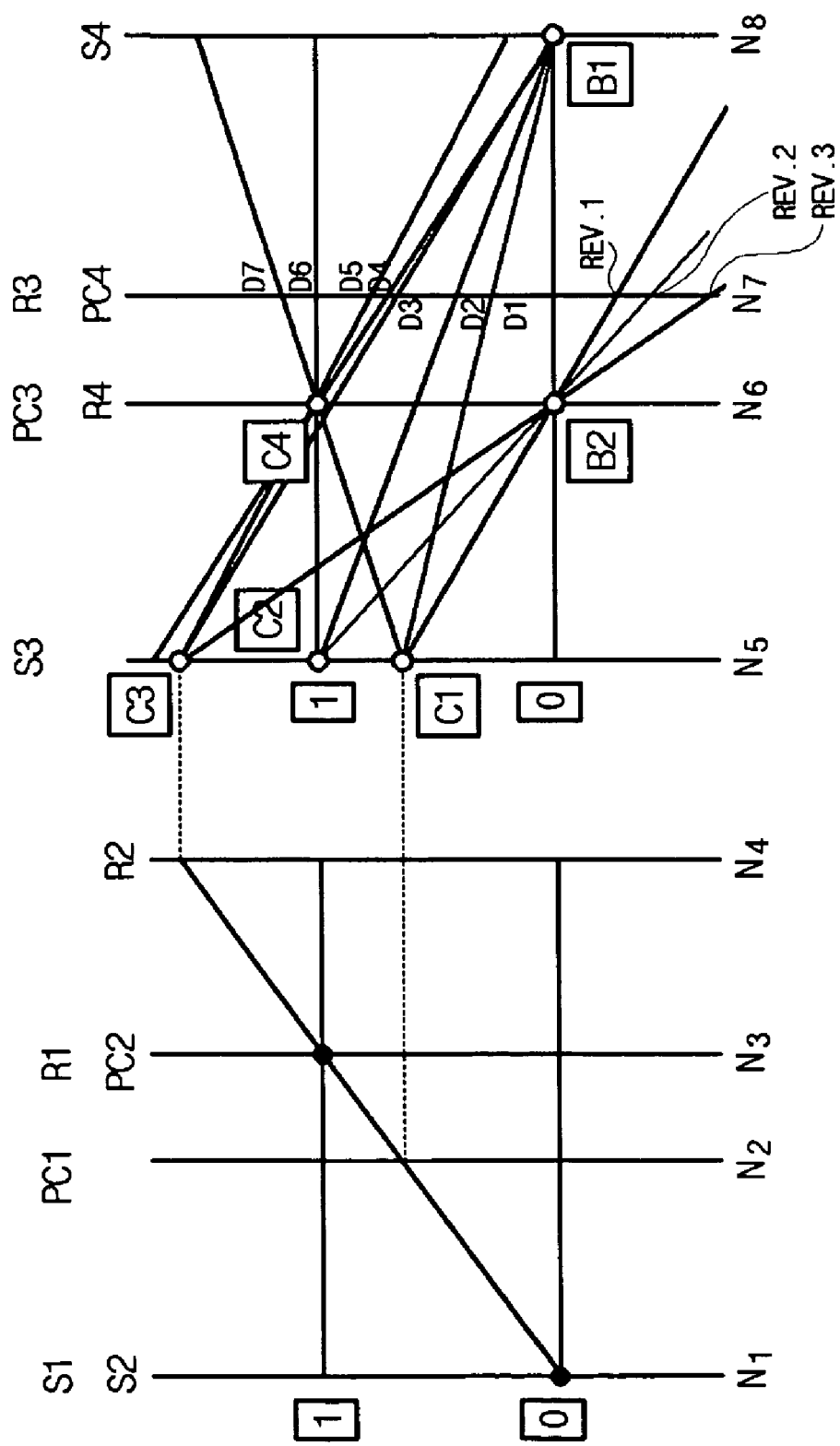
FIG. 22 is a lever diagram showing shifting processes from a first forward speed to a seventh forward speed, and from a first reverse speed to a third reverse speed in a power train of an automatic transmission according to the first embodiment of the present invention.

As shown in FIG. 22, the power train of an automatic transmission according to the first exemplary embodiment of the present invention includes four single pinion planetary gear sets. In addition, the first sun gear S1 is fixedly connected to the second sun gear S2, and the first ring gear R1 is fixedly connected to the second planet carrier PC2. In addition, the third planet carrier PC3 is fixedly connected to the fourth ring gear R4, and the third ring gear R3 is fixedly connected to the fourth planet carrier PC4. Therefore, operational members of the exemplary power train according to the first embodiment of the present invention are represented as eight nodes in the lever diagram.

Accordingly, the first sun gear S1 and the second sun gear S2 are set to a first node N1, the first planet carrier PC1 is set to a second node N2, the first ring gear R1 and the second planet carrier PC2 are set to a third node N3, the second ring gear R2 is set to a fourth node N4, the third sun gear S3 is set to a fifth node N5, the third planet carrier PC3 and the fourth ring gear R4 are set to a sixth node N6, the third ring gear R3 and the fourth planet carrier PC4 are set to a seventh node N7, and the fourth sun gear S4 is set to a eighth node N8.

As described above, at least one of the fixedly connected first ring gear R1 and the second planet carrier PC2 is fixedly connected to the input shaft 100. Therefore, the third node N3 of the first ring gear R1 and the second planet carrier PC2 rotates with the same rotational speed as the input shaft 100.

In addition, at least one of the fixedly connected first sun gear S1 and the second sun gear S2 is fixedly connected to the transmission case 300. Therefore, the first node N1 of the first sun gear S1 and the second sun gear S2 always stops. Therefore, the rotational speed of the engine input through the third node N3 is reduced to the reduced rotational speed at the second node N2 of the first planet carrier PC1 and is increased to the increased rotational speed at the fourth node N4 of the second ring gear R2 by an operation of the speed shift unit 400.

In addition, the third sun gear S3 is variably connected to the first planet carrier PC1 via the first clutch C1, is variably connected to the input shaft 100 via the second clutch C2, and is variably connected to the second ring gear R2 via the third clutch C3. Therefore, the fifth node N5 of the third sun gear S3 respectively receives the reduced rotational speed, the rotational speed of the input shaft, and the increased rotational speed by the operations of the first, second, and third clutches C1, C2, and C3.

In addition, at least one of the fixedly connected third planet carrier PC3 and the fourth ring gear R4 is variably connected to the input shaft 100 via the fourth clutch C4, and is variably connected to the transmission case 300 via the second brake B2. Therefore, the sixth node N6 of the third planet carrier PC3 and the fourth ring gear R4 receives the rotational speed of the input shaft 100 by the operation of the fourth clutch C4, and is stopped by the operation of the second brake B2.

In addition, the fourth sun gear S4 is variably connected to the transmission case 300 via the first brake B1. Therefore, the eighth node N8 of the fourth sun gear S4 is stopped by the operation of the first brake B1.

In addition, at least one of the fixedly connected third ring gear R3 and the fourth planet carrier PC4 is fixedly connected to the output gear 200. Therefore, the seventh node N7 of the third ring gear R3 and the fourth planet carrier PC4 delivers each shift speed that is generated by operations of the speed shift unit 400 and the output unit 500 to the output gear 200.

Hereinafter, formation of each speed by the power train of an automatic transmission according to the first exemplary embodiment of the present invention will be described in detail, with reference to FIG. 22.

In the first forward speed D1, the fifth node N5 receives the reduced rotational speed of the second node N2 by the operation of the first clutch C1. In addition, the eighth node N8 is stopped by the operation of the first brake B1. Therefore, the first forward speed D1 is achieved at the seventh node N7 that is the shift speed output member.

In the second forward speed D2, the fifth node N5 receives the rotational speed of input shaft 100 by the operation of the second clutch C2. In addition, the eighth node N8 is stopped by the operation of the first brake B1. Therefore, the second forward speed D2 is achieved at the seventh node N7 that is the shift speed output member.

In the third forward speed D3, the fifth node N5 receives the increased rotational speed of the fourth node N4 by the operation of the third clutch C3. In addition, the eighth node N8 is stopped by the operation of the first brake B1. Therefore, the third forward speed D3 is achieved at the seventh node N7 that is the shift speed output member.

In the fourth forward speed D4, the sixth node N6 receives the rotational speed of the input shaft 100 by the operation of the fourth clutch C4. In addition, the eighth node N8 is stopped by the operation of the first brake B1. Therefore, the fourth forward speed D4 is achieved at the seventh node N7 that is the shift speed output member.

In the fifth forward speed D5, the fifth node N5 receives the increased rotational speed of the fourth node N4 by the operation of the third clutch C3. In addition, the sixth node N6 receives the rotational speed of the input shaft 100 by the operation of the fourth clutch C4. Therefore, the fifth forward speed D5 is achieved at the seventh node N7 that is the shift speed output member.

In the sixth forward speed D6, the fifth node N5 receives the rotational speed of input shaft 100 by the operation of the second clutch C2. In addition, the sixth node N6 receives the rotational speed of the input shaft 100 by the operation of the fourth clutch C4. Therefore, the sixth forward speed D6 is achieved at the seventh node N7 that is the shift speed output member.

In the seventh forward speed D7, the fifth node N5 receives the reduced rotational speed of the second node N2 by the operation of the first clutch C1. In addition, the sixth node N6 receives the rotational speed of the input shaft 100 by the operation of the fourth clutch C4. Therefore, the seventh forward speed D7 is achieved at the seventh node N7 that is the shift speed output member.

In the first reverse speed REV. 1, the fifth node N5 receives the reduced rotational speed of the second node N2 by the operation of the first clutch C1. In addition, the sixth node N6 is stopped by the operation of the second brake B2. Therefore, the first reverse speed REV. 1 is achieved at the seventh node N7 that is the shift speed output member.

In the second reverse speed REV. 2, the fifth node N5 receives the rotational speed of input shaft 100 by the operation of the second clutch C2. In addition, the sixth node N6 is stopped by the operation of the second brake B2. Therefore, the second reverse speed REV. 2 is achieved at the seventh node N7 that is the shift speed output member.

In the third reverse speed REV. 3, the fifth node N5 receives the increased rotational speed of the fourth node N4 by the operation of the third clutch C3. In addition, the sixth node N6 is stopped by the operation of the second brake B2. Therefore, the third reverse speed REV. 3 is achieved at the seventh node N7 that is the shift speed output member.

As described above, the speed line for each planetary gear set may be easily obtained by a person of an ordinary skill in the art based on the teachings herein.

Hereinafter, referring to FIG. 2, an exemplary power train of an automatic transmission according to a second embodiment of the present invention will be described in detail.

Figure 2:
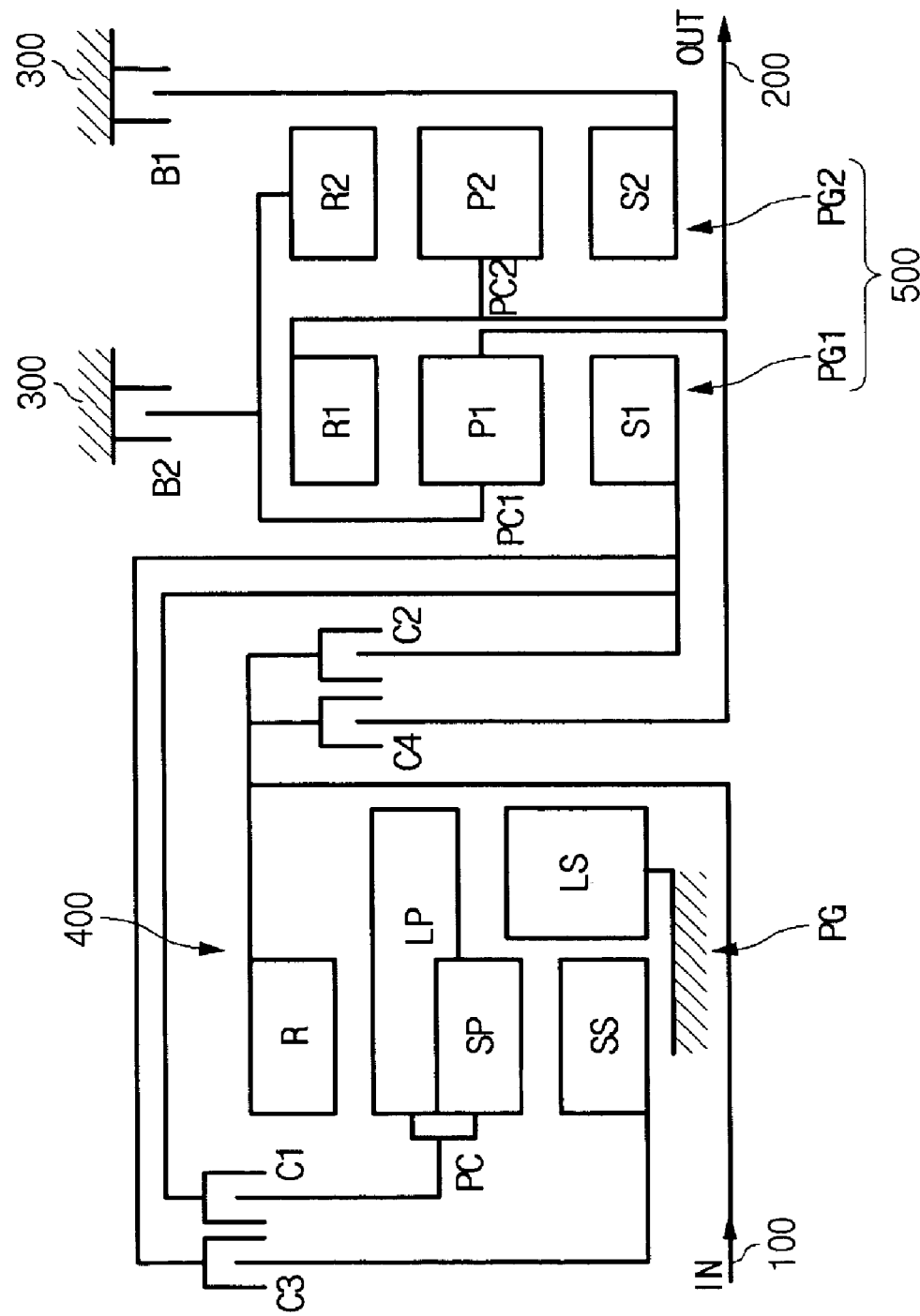
FIG. 2 is a schematic diagram of a power train of an automatic transmission according to a second exemplary embodiment of the present invention.

As shown in FIG. 2, according to the second exemplary embodiment of the present invention, the speed shift unit 400 includes a Ravigneaux planetary gear set PG, and the output unit 500 includes first and second planetary gear sets PG1 and PG2.

The Ravigneaux planetary gear set PG includes a long-pinion-side sun gear LS, a short-pinion-side sun gear SS, a Ravigneaux planet carrier PC, and a Ravigneaux ring gear R as operational members thereof. A long pinion gear LP, being engaged with both the long-pinion-side sun gear LS and the Ravigneaux ring gear R, and a short pinion gear SP, being engaged with both the short-pinion-side sun gear SS and the Ravigneaux ring gear R, are connected to and are carried by the Ravigneaux planet carrier PC.

The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof.

According to the second exemplary embodiment of the present invention, the Ravigneaux ring gear R is operated as the fixed input member, the long-pinion-side sun gear LS is operated as the fixedly stopped member, the Ravigneaux planet carrier PC is operated as the reduced speed output member, and the short-pinion-side sun gear SS is operated as the increased speed output member.

In addition, the first ring gear R1 is fixedly connected to the second planet carrier PC2, and the first planet carrier PC1 is fixedly connected to the second ring gear R2. In addition, the first ring gear R1 is operated as the variable input member, at least one of the fixedly connected first planet carrier PC1 and the second ring gear R2 is operated as the variable input/stopped member, the second sun gear S2 is operated as the variably stopped member, and at least one of the fixedly connected first ring gear R1 and the second planet carrier PC2 is operated as the shift speed output member.

According to the second exemplary embodiment of the present invention, the first and third clutches C1 and C3 are disposed on an opposite side to the output unit 500 with reference to the speed shift unit 400, the second and fourth clutches C2 and C4 are disposed between the speed shift unit 400 and the output unit 500. In addition, the first brake B1 is disposed on an opposite side to the speed shift unit 400 with reference to the output unit 500.

The Ravigneaux planetary gear set PG and the first and second planetary gear sets PG1 and PG2 are disposed in a sequence of the Ravigneaux planetary gear set PG, the first planetary gear set PG1, and the second planetary gear set PG2.

Hereinafter, referring to FIG. 3, the exemplary power train of an automatic transmission according to the third embodiment of the present invention will be described in detail.

Figure 3:
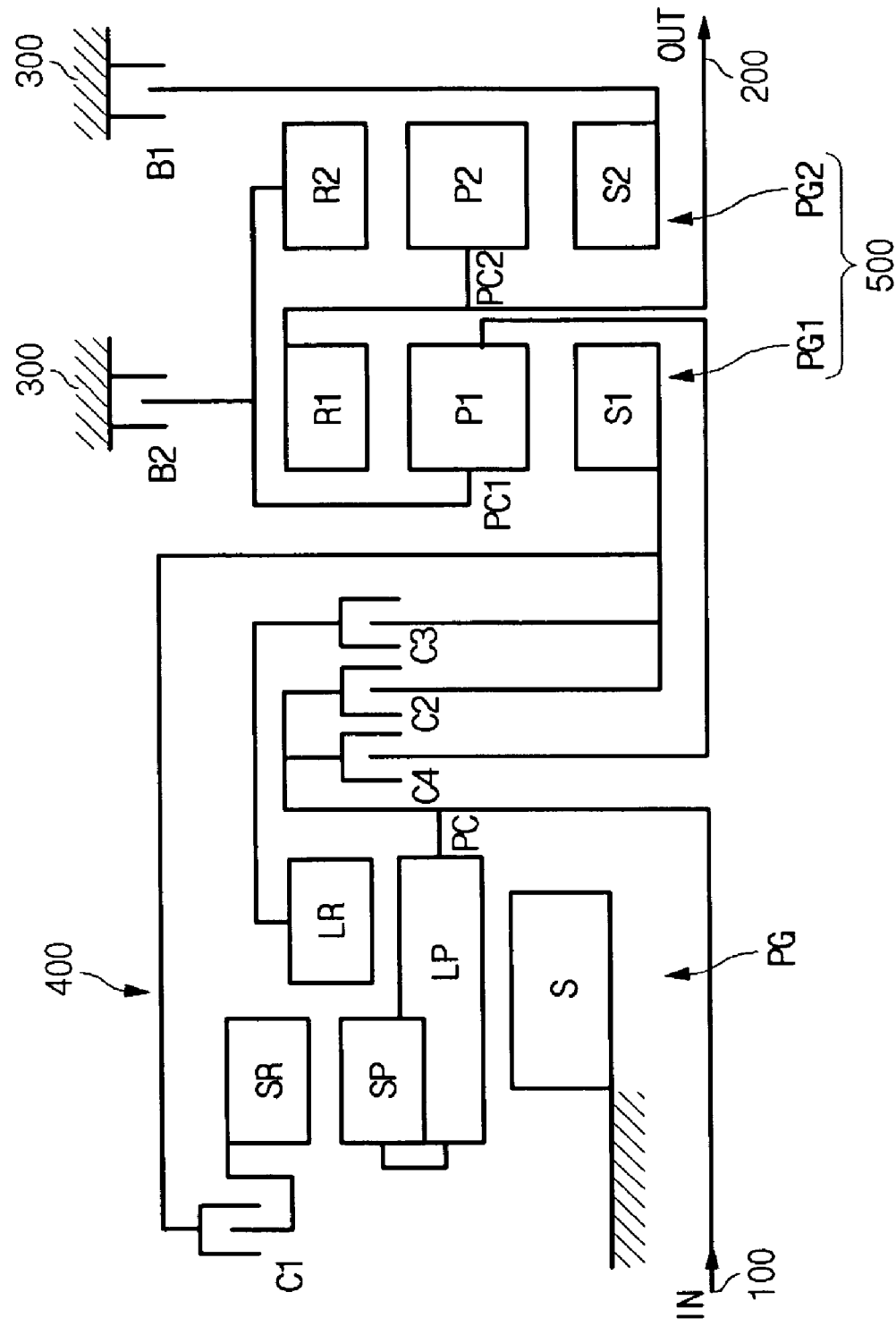
FIG. 3 is a schematic diagram of a power train of an automatic transmission according to a third exemplary embodiment of the present invention.

As shown in FIG. 3, according to the third exemplary embodiment of the present invention, the speed shift unit 400 includes a compound planetary gear set PG, and the output unit 500 includes first and second planetary gear sets PG1 and PG2.

The compound planetary gear set PG includes a compound sun gear S, a compound planet carrier PC, a long-pinion-side ring gear LR, and a short-pinion-side ring gear SR as operational members thereof. In addition, a long pinion gear LP, being engaged with both the long-pinion-side ring gear LR and the compound sun gear S, and a short pinion gear SP, being engaged with both the short-pinion-side ring gear SR and the compound sun gear S, are connected to and are carried by the compound planet carrier PC.

The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof.

According to the third exemplary embodiment of the present invention, the compound planet carrier PC is operated as the fixed input member, the compound sun gear S is operated as the fixedly stopped member, the short-pinion-side ring gear SR is operated as the reduced speed output member, and the long-pinion-side ring gear LR is operated as the increased speed output member.

In addition, the first ring gear R1 is fixedly connected to the second planet carrier PC2, and the first planet carrier PC1 is fixedly connected to the second ring gear R2. In addition, the first sun gear S1 is operated as the variable input member, at least one of the fixedly connected first planet carrier PC1 and the second ring gear R2 is operated as the variable input/stopped member, the second sun gear S2 is operated as the variably stopped member, and at least one of the fixedly connected first ring gear R1 and the second planet carrier PC2 is operated as the shift speed output member.

According to the third exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the first brake B1 is disposed on an opposite side to the speed shift unit 400 with reference to the output unit 500.

The compound planetary gear set PG and the first and second planetary gear sets PG1 and PG2 are disposed in a sequence of the compound planetary gear set PG, the first planetary gear set PG1, and the second planetary gear set PG2.

Hereinafter, referring to FIG. 4, the exemplary power train of an automatic transmission according to the fourth embodiment of the present invention will be described in detail.

Figure 4:
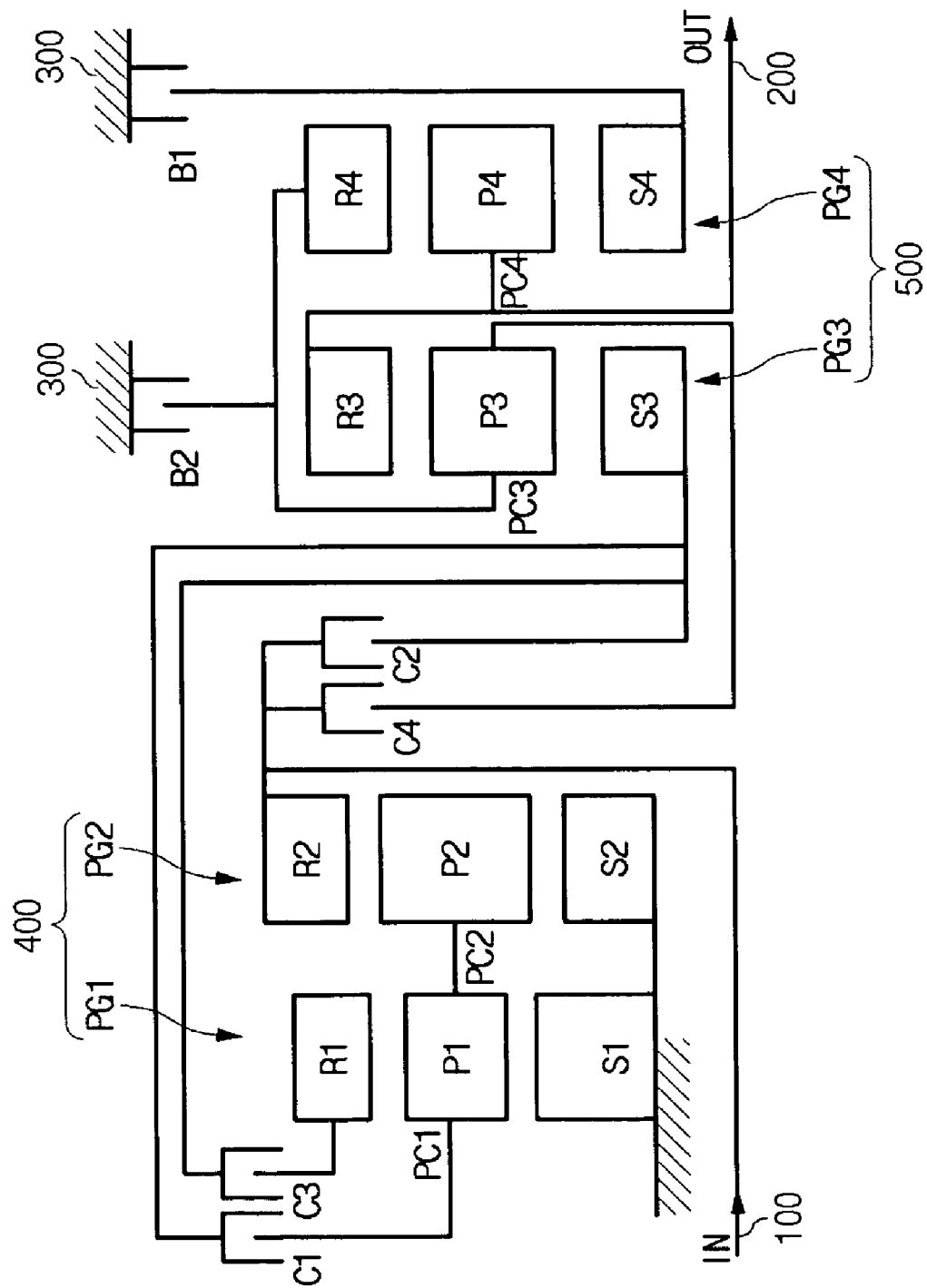
FIG. 4 is a schematic diagram of a power train of an automatic transmission according to a fourth exemplary embodiment of the present invention.

As shown in FIG. 4, according to the fourth exemplary embodiment of the present invention, the speed shift unit 400 includes first and second planetary gear sets PG1 and PG2, and the output unit 500 includes third and fourth planetary gear sets PG3 and PG4. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof. The third planetary gear set PG3 is a single pinion planetary gear set, and includes a third sun gear S3, a third planet carrier PC3, and a third ring gear R3 as operational members thereof. The fourth planetary gear set PG4 is a single pinion planetary gear set, and includes a fourth sun gear S4, a fourth planet carrier PC4, and a fourth ring gear R4 as operational members thereof.

According to the fourth exemplary embodiment of the present invention, the first planet carrier PC1 is fixedly connected to the second planet carrier PC2, and the first sun gear S1 is fixedly connected to the second sun gear S2. In addition, the second ring gear R2 is operated as the fixed input member, at least one of the fixedly connected first sun gear S1 and the second sun gear S2 is operated as the fixedly stopped member, at least one of the fixedly connected first planet carrier PC1 and the second planet carrier PC2 is operated as the reduced speed output member, and the first ring gear R1 is operated as the increased speed output member.

In addition, the third ring gear R3 is fixedly connected to the fourth planet carrier PC4, and the third planet carrier PC3 is fixedly connected to the fourth ring gear R4. In addition, the third sun gear S3 is operated as the variable input member, at least one of the fixedly connected third planet carrier PC3 and the fourth ring gear R4 is operated as the variable input/stopped member, the fourth sun gear S4 is operated as the variably stopped member, and at least one of the fixedly connected third ring gear R3 and the fourth planet carrier PC4 is operated as the shift speed output member.

According to the fourth exemplary embodiment of the present invention, the first and third clutches C1 and C3 are disposed on an opposite side to the output unit 500 with reference to the speed shift unit 400, and the second and fourth clutches C2 and C4 are disposed between the speed shift unit 400 and the output unit 500. In addition, the first brake B1 is disposed on an opposite side to the speed shift unit 400 with reference to the output unit 500.

The first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

Hereinafter, referring to FIG. 5, the exemplary power train of an automatic transmission according to the fifth embodiment of the present invention will be described in detail.

Figure 5:
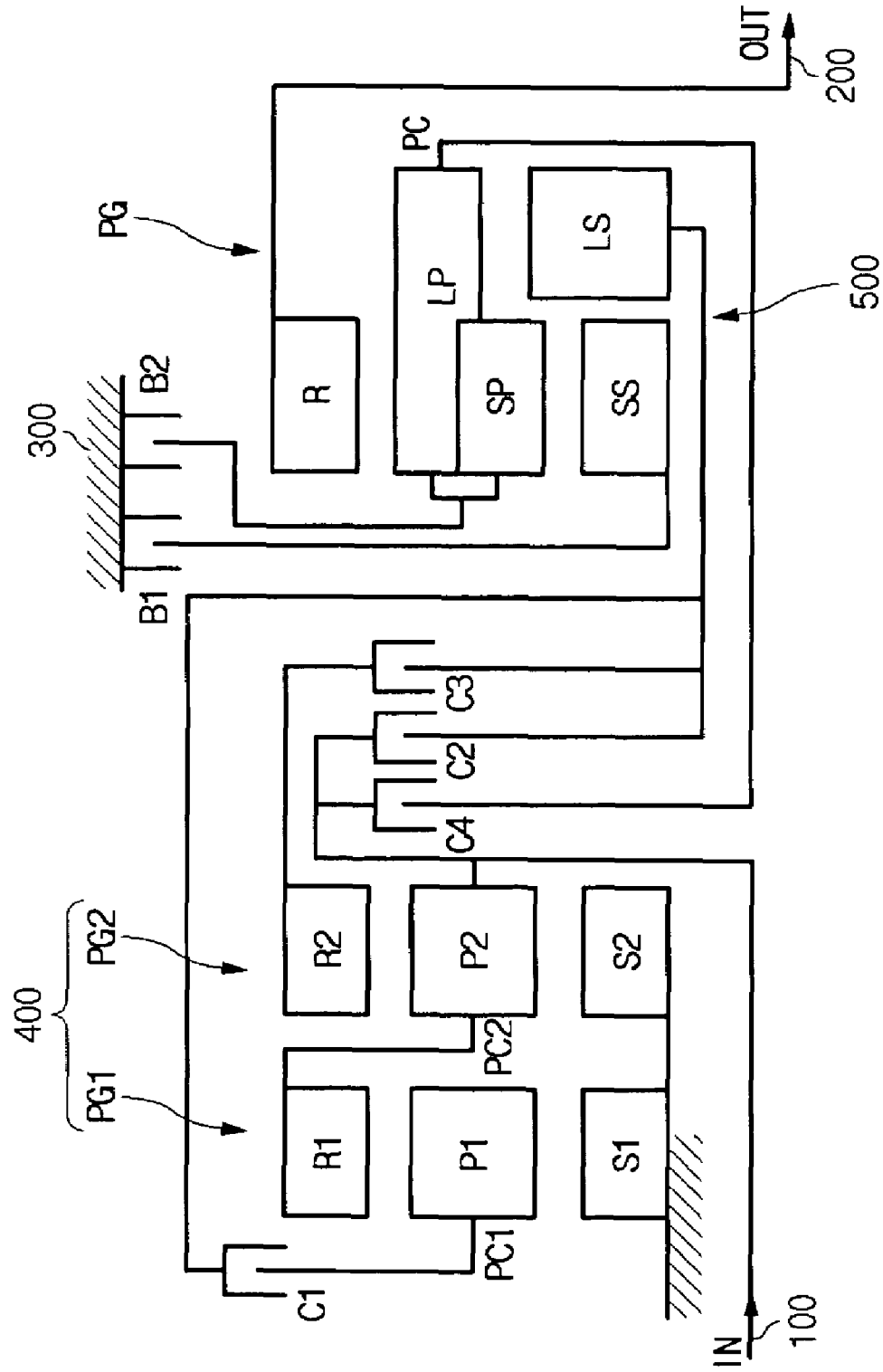
FIG. 5 is a schematic diagram of a power train of an automatic transmission according to a fifth exemplary embodiment of the present invention.

As shown in FIG. 5, according to the fifth exemplary embodiment of the present invention, the speed shift unit 400 includes first and second planetary gear sets PG1 and PG2, and the output unit 500 includes a Ravigneaux planetary gear set PG. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof. The Ravigneaux planetary gear set PG includes a long-pinion-side sun gear LS, a short-pinion-side sun gear SS, a Ravigneaux planet carrier PC, and a Ravigneaux ring gear R as operational members thereof.

According to the fifth exemplary embodiment of the present invention, the speed shift unit 400 is the same as the speed shift unit 400 of the first exemplary embodiment of the present invention. Therefore, a detailed description will be omitted.

According to the fifth exemplary embodiment of the present invention, the long-pinion-side sun gear LS is operated as the variable input member, the Ravigneaux planet carrier PC is operated as the variable input/stopped member, the short-pinion-side sun gear SS is operated as the variably stopped member, and the Ravigneaux ring gear R is operated as the shift speed output member.

According to the fifth exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the first and second brakes B1 and B2 are also disposed between the speed shift unit 400 and the output unit 500.

The first and second planetary gear sets PG1 and PG2 and the Ravigneaux planetary gear set PG are disposed in a sequence of the first planetary gear set PG1, the second planetary gear set PG2, and the Ravigneaux planetary gear set PG.

Hereinafter, referring to FIG. 6, the exemplary power train of an automatic transmission according to the sixth embodiment of the present invention will be described in detail.

Figure 6:
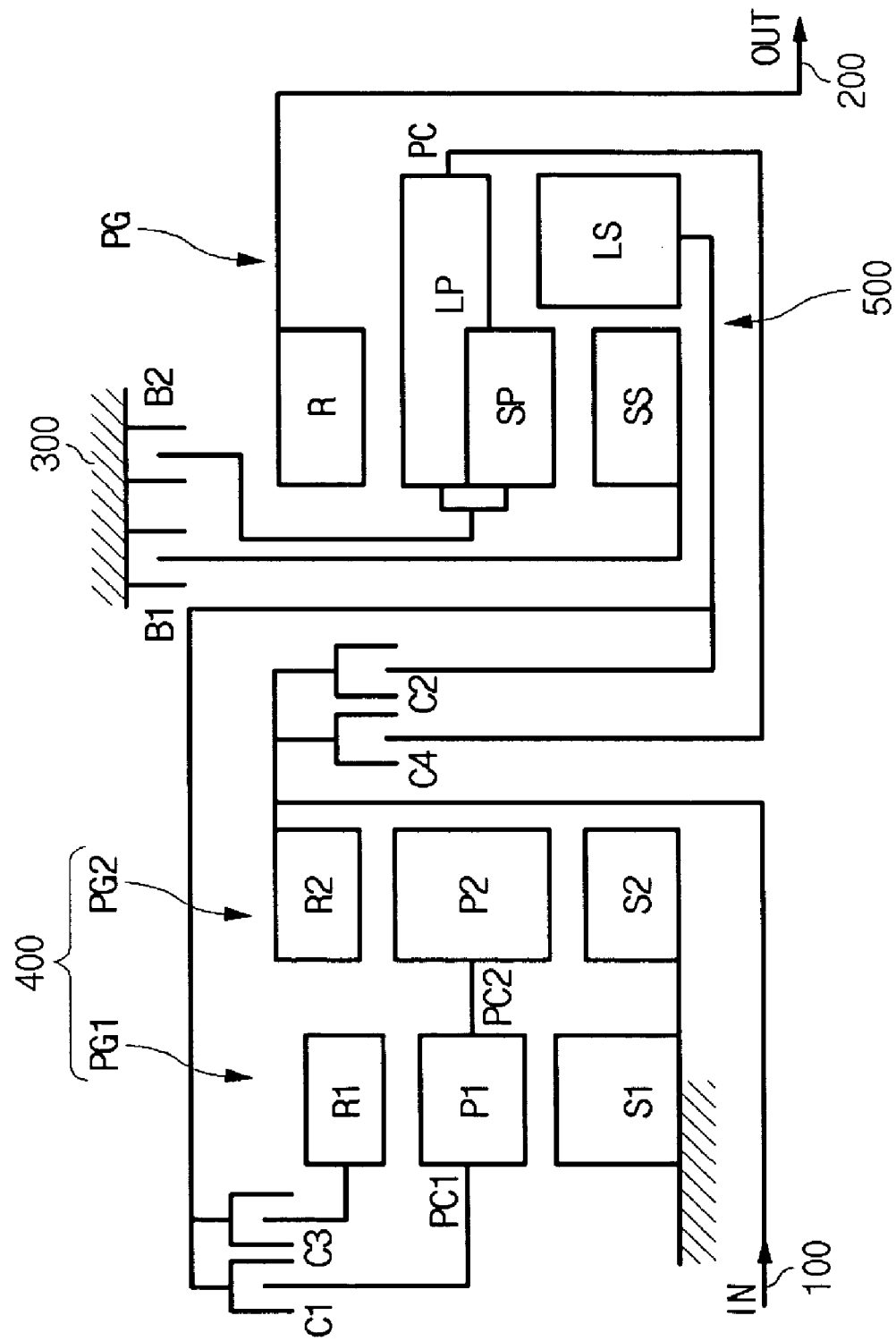
FIG. 6 is a schematic diagram of a power train of an automatic transmission according to a sixth exemplary embodiment of the present invention.

As shown in FIG. 6, according to the sixth exemplary embodiment of the present invention, the speed shift unit 400 includes first and second planetary gear sets PG1 and PG2, and the output unit 500 includes a Ravigneaux planetary gear set PG. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof. The Ravigneaux planetary gear set PG includes a long-pinion-side sun gear LS, a short-pinion-side sun gear SS, a Ravigneaux planet carrier PC, and a Ravigneaux ring gear R as operational members thereof.

According to the sixth exemplary embodiment of the present invention, the speed shift unit 400 is the same as the speed shift unit 400 of the fourth exemplary embodiment of the present invention. Therefore, a detailed description will be omitted.

According to the sixth exemplary embodiment of the present invention, the long-pinion-side sun gear LS is operated as the variable input member, the Ravigneaux planet carrier PC is operated as the variable input/stopped member, the short-pinion-side sun gear SS is operated as the variably stopped member, and the Ravigneaux ring gear R is operated as the shift speed output member.

According to the sixth exemplary embodiment of the present invention, the first and third clutches C1 and C3 are disposed on an opposite side to the output unit 500 with reference to the speed shift unit 400, and the second and fourth clutches C2 and C4 disposed between the speed shift unit 400 and the output unit 500. In addition, the first and second brakes B1 and B2 are also disposed between the speed shift unit 400 and the output unit 500.

The first and second planetary gear sets PG1 and PG2 and the Ravigneaux planetary gear set PG are disposed in a sequence of the first planetary gear set PG1, the second planetary gear set PG2, and the Ravigneaux planetary gear set PG.

Hereinafter, referring to FIG. 7, the exemplary power train of an automatic transmission according to the seventh embodiment of the present invention will be described in detail.

Figure 7:
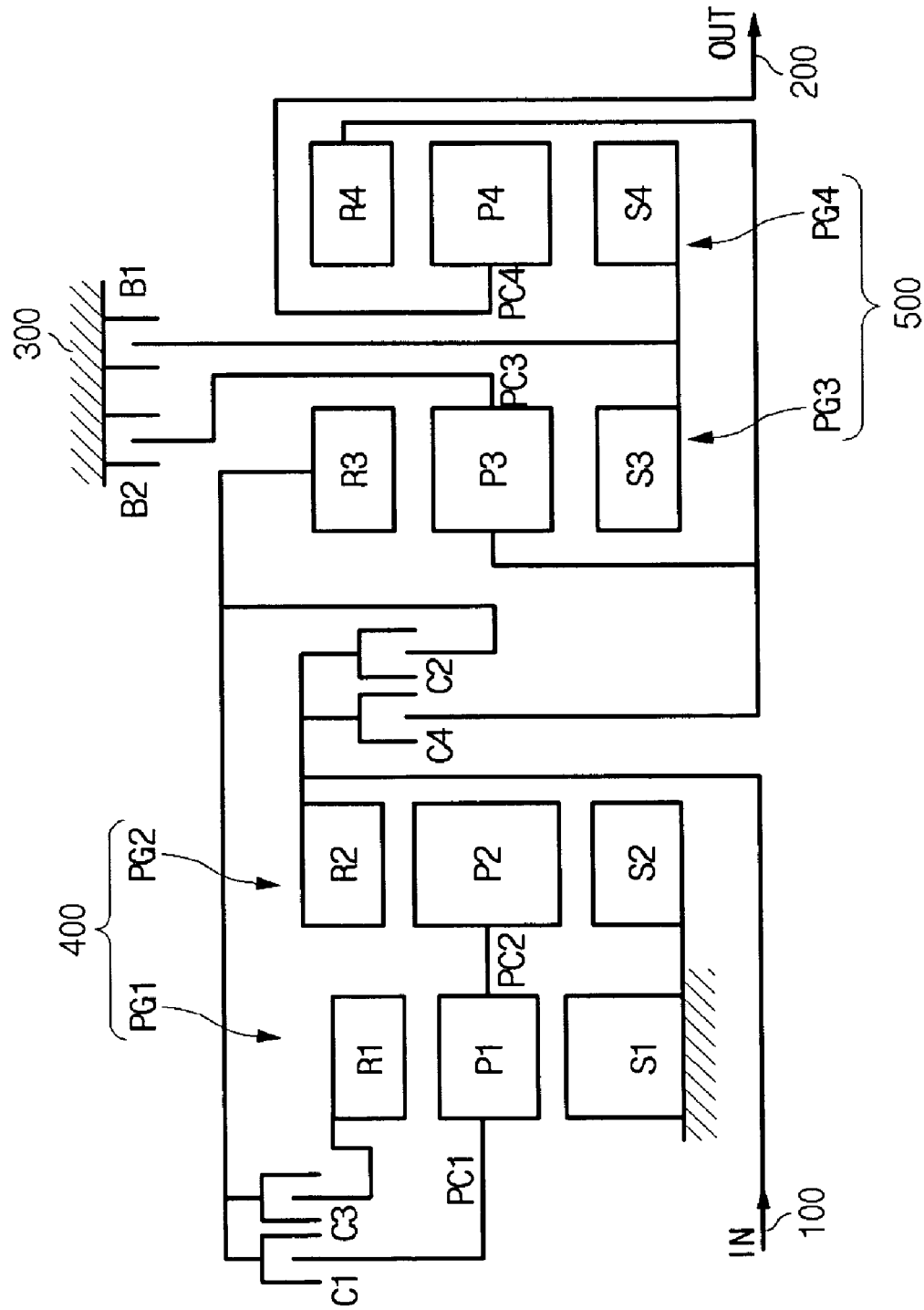
FIG. 7 is a schematic diagram of a power train of an automatic transmission according to a seventh exemplary embodiment of the present invention.

As shown in FIG. 7, according to the seventh exemplary embodiment of the present invention, the speed shift unit 400 includes first and second planetary gear sets PG1 and PG2, and the output unit 500 includes third and fourth planetary gear sets PG3 and PG4. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof. The third planetary gear set PG3 is a single pinion planetary gear set, and includes a third sun gear S3, a third planet carrier PC3, and a third ring gear R3 as operational members thereof. The fourth planetary gear set PG4 is a single pinion planetary gear set, and includes a fourth sun gear S4, a fourth planet carrier PC4, and a fourth ring gear R4 as operational members thereof.

According to the seventh exemplary embodiment of the present invention, the speed shift unit 400 is the same as the speed shift unit 400 of the fourth exemplary embodiment of the present invention. Therefore, a detailed description will be omitted.

According to the seventh exemplary embodiment of the present invention, the third sun gear S3 is fixedly connected to the fourth sun gear S4, and the third planet carrier PC3 is fixedly connected to the fourth ring gear R4. In addition, the third ring gear R3 is operated as the variable input member, at least one of the fixedly connected third planet carrier PC3 and the fourth ring gear R4 is operated as the variable input/stopped member, at least one of the fixedly connected third sun gear S3 and the fourth sun gear S4 is operated as the variably stopped member, and the fourth planet carrier PC4 is operated as the shift speed output member.

According to the seventh exemplary embodiment of the present invention, the first and third clutches C1 and C3 are disposed on an opposite side to the output unit 500 with reference to the speed shift unit 400, the second and fourth clutches C2 and C4 are disposed between the speed shift unit 400 and the output unit 500. In addition, the first and second brakes B1 and B2 are disposed between the third planetary gear set PG3 and the fourth planetary gear set PG4.

The first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

Hereinafter, referring to FIG. 8, the exemplary power train of an automatic transmission according to the eighth embodiment of the present invention will be described in detail.

Figure 8:
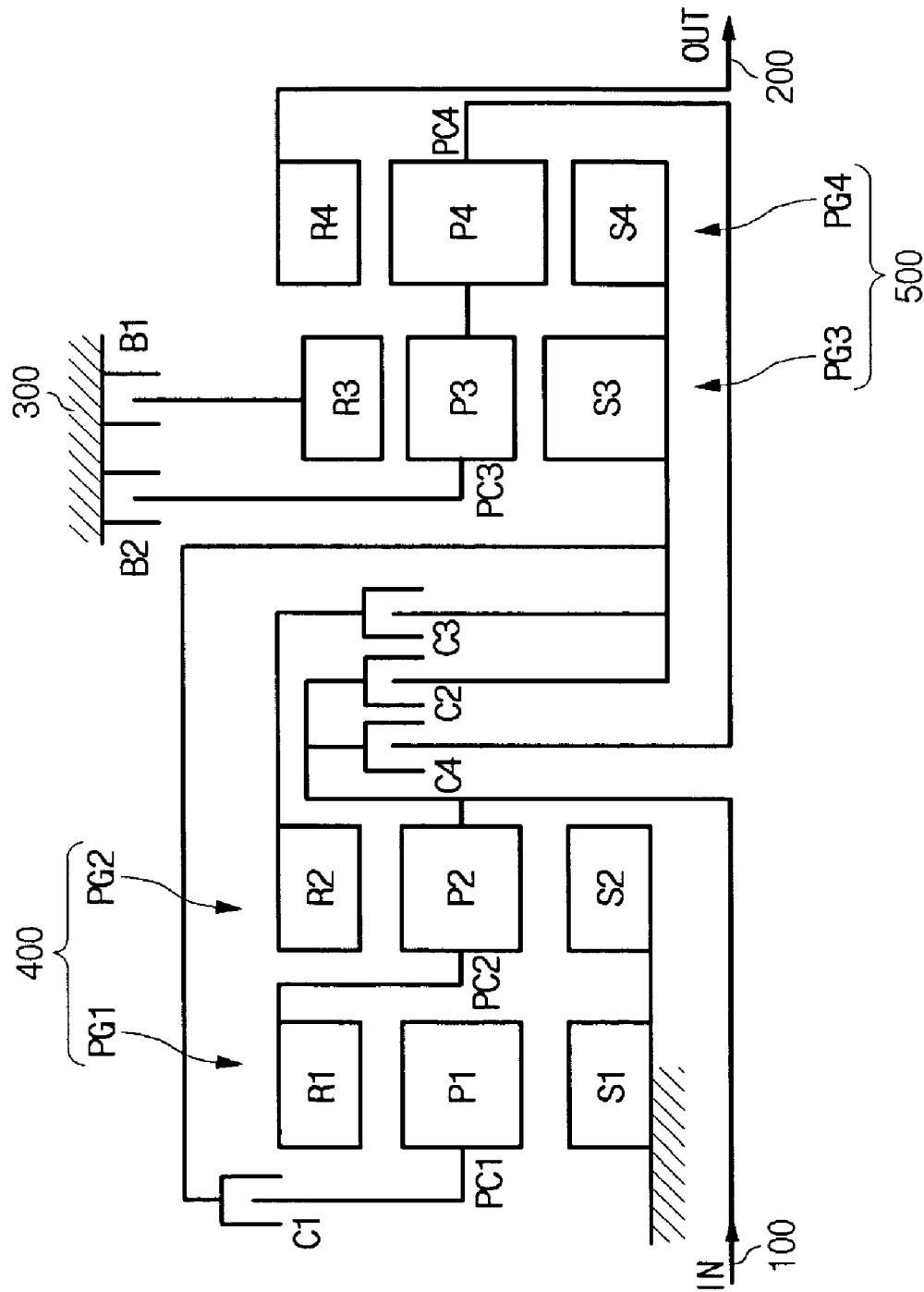
FIG. 8 is a schematic diagram of a power train of an automatic transmission according to a eighth exemplary embodiment of the present invention.

As shown in FIG. 8, according to the eighth exemplary embodiment of the present invention, the speed shift unit 400 includes first and second planetary gear sets PG1 and PG2, and the output unit 500 includes third and fourth planetary gear sets PG3 and PG4. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof. The third planetary gear set PG3 is a single pinion planetary gear set, and includes a third sun gear S3, a third planet carrier PC3, and a third ring gear R3 as operational members thereof. The fourth planetary gear set PG4 is a single pinion planetary gear set, and includes a fourth sun gear S4, a fourth planet carrier PC4, and a fourth ring gear R4 as operational members thereof.

According to the eighth exemplary embodiment of the present invention, the speed shift unit 400 is the same as the speed shift unit of the first exemplary embodiment of the present invention. Therefore, a detailed description will be omitted.

According to the eighth exemplary embodiment of the present invention, the third sun gear S3 is fixedly connected to the fourth sun gear S4, and the third planet carrier PC3 is fixedly connected to the fourth planet carrier PC4. In addition, at least one of the fixedly connected third sun gear S3 and the fourth sun gear S4 is operated as the variable input member, and at least one of the fixedly connected third planet carrier PC3 and the fourth planet carrier PC4 is operated as the variable input/stopped member, the third ring gear R3 is operated as the variably stopped member, and the fourth ring gear R4 is operated as the shift speed output member.

According to the eighth exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the second brake B2 is disposed between the speed shift unit 400 and the output unit 500.

The first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

Hereinafter, referring to FIG. 9, the exemplary power train of an automatic transmission according to the ninth embodiment of the present invention will be described in detail.

Figure 9:
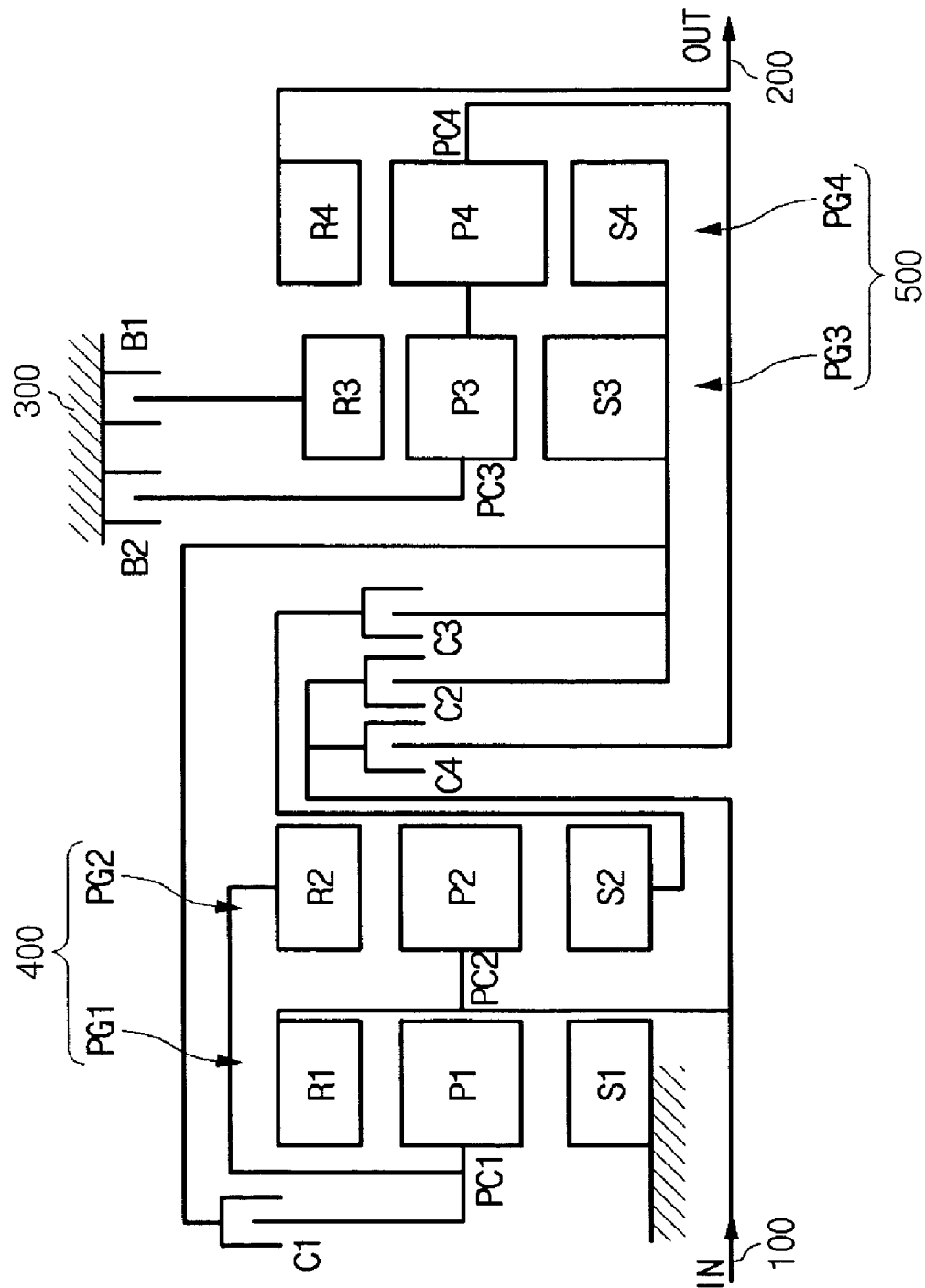
FIG. 9 is a schematic diagram of a power train of an automatic transmission according to a ninth exemplary embodiment of the present invention.

As shown in FIG. 9, according to the ninth exemplary embodiment of the present invention, the speed shift unit 400 includes first and second planetary gear sets PG1 and PG2, and the output unit 500 includes third and fourth planetary gear sets PG3 and PG4. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof. The third planetary gear set PG3 is a single pinion planetary gear set, and includes a third sun gear S3, a third planet carrier PC3, and a third ring gear R3 as operational members thereof. The fourth planetary gear set PG4 is a single pinion planetary gear set, and includes a fourth sun gear S4, a fourth planet carrier PC4, and a fourth ring gear R4 as operational members thereof.

According to the ninth exemplary embodiment of the present invention, the first ring gear R1 is fixedly connected to the second planet carrier PC2, and the first planet carrier PC1 is fixedly connected to the second ring gear R2. In addition, at least one of the fixedly connected first ring gear R1 and the second planet carrier PC2 is operated as the fixed input member, the first sun gear S1 is operated as the fixedly stopped member, at least one of the fixedly connected first planet carrier PC1 and the second ring gear R2 is operated as the reduced speed output member, and the second sun gear S2 is operated as the increased speed output member.

According to the ninth exemplary embodiment of the present invention, the third sun gear S3 is fixedly connected to the fourth sun gear S4, and the third planet carrier PC3 is fixedly connected to the fourth planet carrier PC4. In addition, at least one of the fixedly connected third sun gear S3 and the fourth sun gear S4 is operated as the variable input member, at least one of the fixedly connected third planet carrier PC3 and the fourth planet carrier PC4 is operated as the variable input/stopped member, the third ring gear R3 is operated as the variably stopped member, and the fourth ring gear R4 is operated as the shift speed output member.

According to the ninth exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the second brake B2 is disposed between the speed shift unit 400 and the output unit 500.

The first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

Hereinafter, referring to FIG. 10, the exemplary power train of an automatic transmission according to the tenth embodiment of the present invention will be described in detail.

Figure 10:
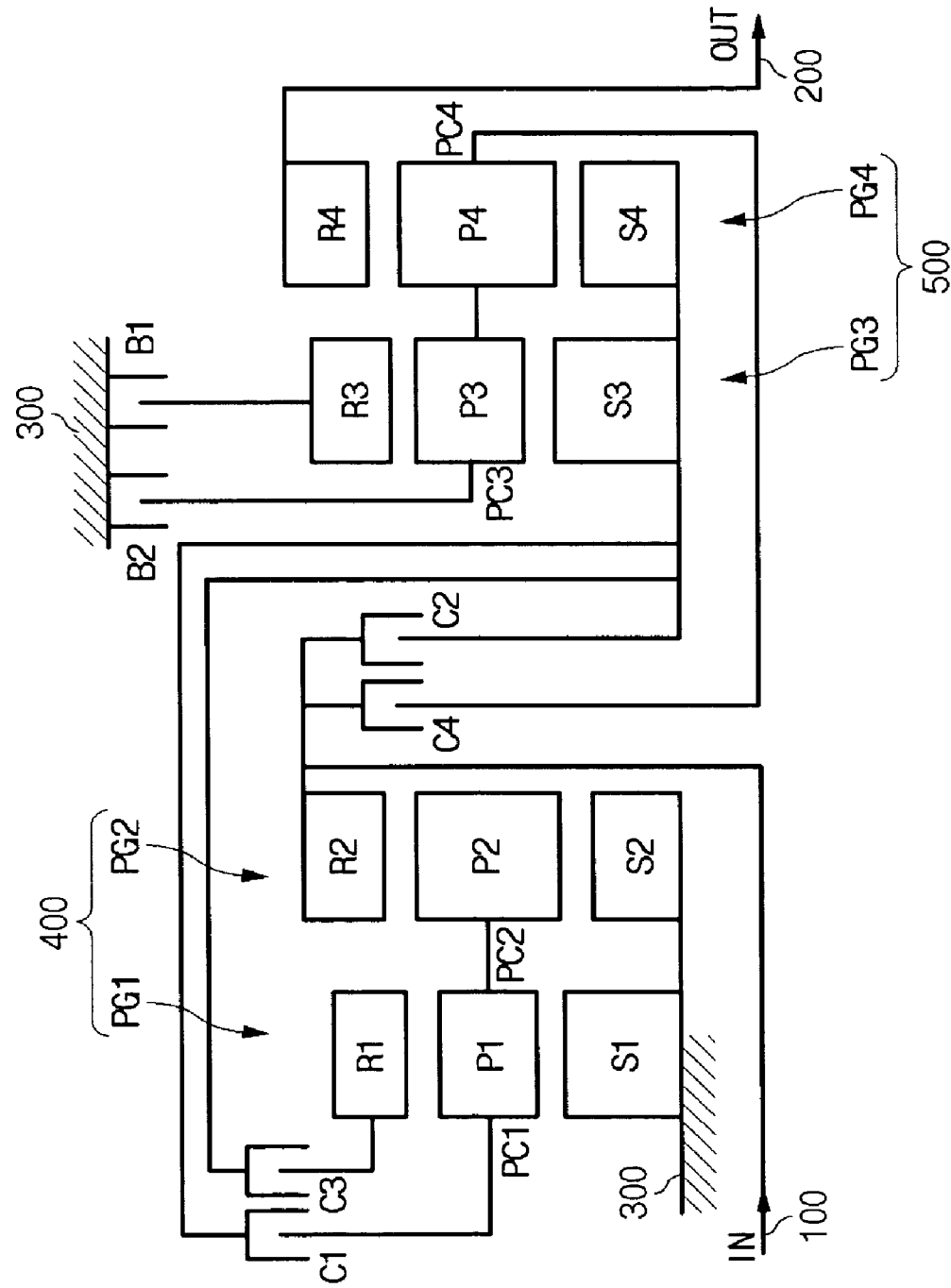
FIG. 10 is a schematic diagram of a power train of an automatic transmission according to a tenth exemplary embodiment of the present invention.

As shown in FIG. 10, according to the tenth exemplary embodiment of the present invention, the speed shift unit 400 includes first and second planetary gear sets PG1 and PG2, and the output unit 500 includes third and fourth planetary gear sets PG3 and PG4. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof. The third planetary gear set PG3 is a single pinion planetary gear set, and includes a third sun gear S3, a third planet carrier PC3, and a third ring gear R3 as operational members thereof. The fourth planetary gear set PG4 is a single pinion planetary gear set, and includes a fourth sun gear S4, a fourth planet carrier PC4, and a fourth ring gear R4 as operational members thereof.

According to the tenth exemplary embodiment of the present invention, the speed shift unit 400 is the same as the speed shift unit 400 of the fourth exemplary embodiment of the present invention. Therefore, a detailed description will be omitted.

According to the tenth exemplary embodiment of the present invention, the third sun gear S3 is fixedly connected to the fourth sun gear S4, and the third planet carrier PC3 is fixedly connected to the fourth planet carrier PC4. In addition, at least one of the fixedly connected third sun gear S3 and the fourth sun gear S4 is operated as the variable input member, at least one of the fixedly connected third planet carrier PC3 and the fourth planet carrier PC4 is operated as the variable input/stopped member, the third ring gear R3 is operated as the variably stopped member, and the fourth ring gear R4 is operated as the shift speed output member.

According to the tenth exemplary embodiment of the present invention, the first and third clutches C1 and C3 are disposed on an opposite side to the output unit 500 with reference to the speed shift unit 400, and the second and fourth clutches C2 and C4 are disposed between the speed shift unit 400 and the output unit 500. In addition, the second brake B2 is disposed between the speed shift unit 400 and the output unit 500.

The first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

Hereinafter, referring to FIG. 11, the exemplary power train of an automatic transmission according to the eleventh embodiment of the present invention will be described in detail.

Figure 11:
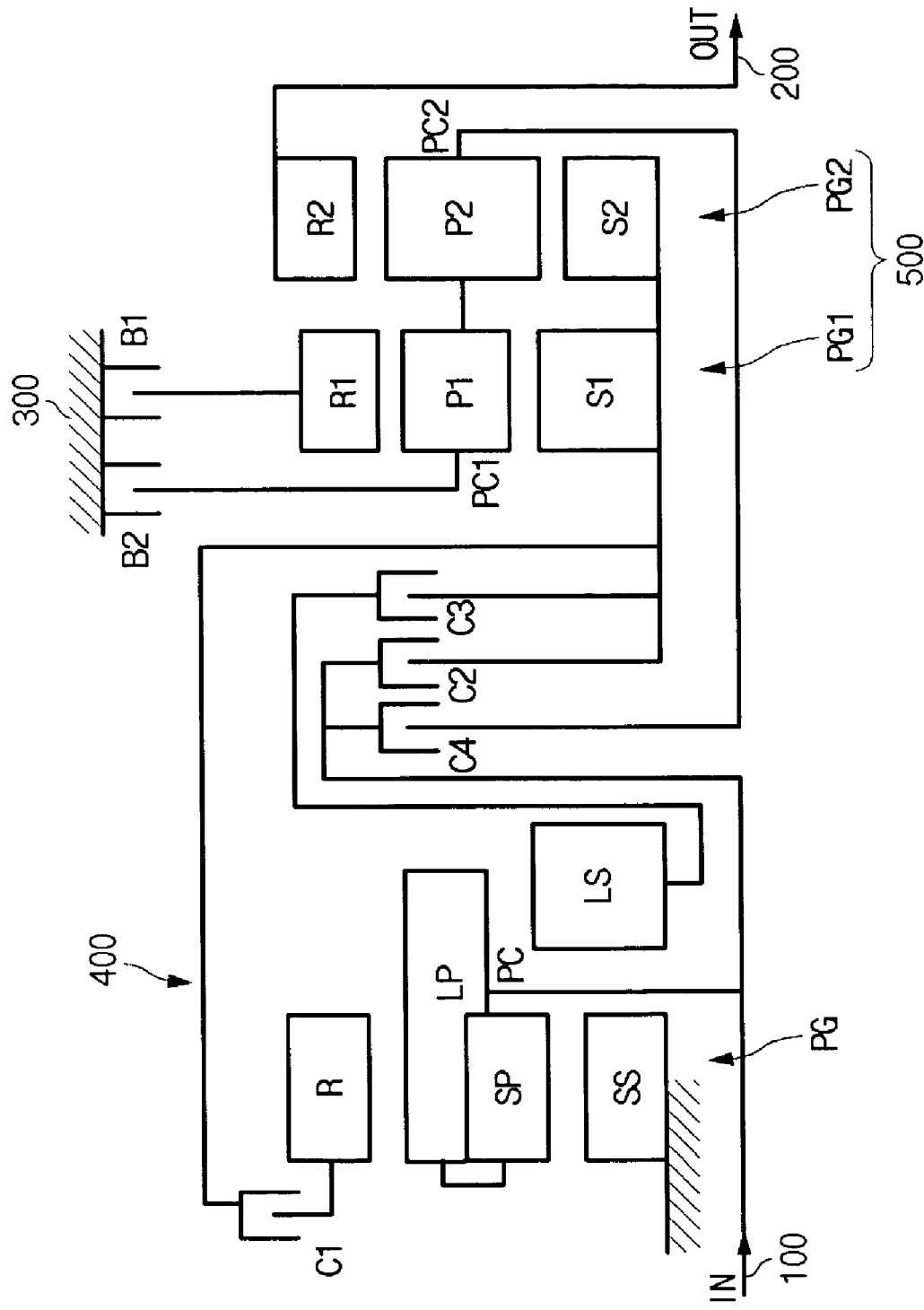
FIG. 11 is a schematic diagram of a power train of an automatic transmission according to a eleventh exemplary embodiment of the present invention.

As shown in FIG. 11, according to the eleventh exemplary embodiment of the present invention, the speed shift unit 400 includes a Ravigneaux planetary gear set PG, and the output unit 500 includes first and second planetary gear sets PG1 and PG2. The Ravigneaux planetary gear set PG includes a long-pinion-side sun gear LS, a short-pinion-side sun gear SS, a Ravigneaux planet carrier PC, and a Ravigneaux ring gear R as operational members thereof. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof.

According to the eleventh exemplary embodiment of the present invention, the Ravigneaux planet carrier PC is operated as the fixed input member, the short-pinion-side sun gear SS is operated as the fixedly stopped member, the Ravigneaux ring gear R is operated as the reduced speed output member, and the long-pinion-side sun gear LS is operated as the increased speed output member.

In addition, the first sun gear S1 is fixedly connected to the second sun gear S2, and the first planet carrier PC1 is fixedly connected to the second planet carrier PC2. In addition, at least one of the fixedly connected first sun gear S1 and the second sun gear S2 is operated as the variable input member, at least one of the fixedly connected first planet carrier PC1 and the second planet carrier PC2 is operated as the variable input/stopped member, the first ring gear R1 is operated as the variably stopped member, and the second ring gear R2 is operated as the shift speed output member.

According to the eleventh exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the second brake B2 is disposed between the speed shift unit 400 and the output unit 500.

The Ravigneaux planetary gear set PG and the first and second planetary gear sets PG1 and PG2 are disposed in a sequence of the Ravigneaux planetary gear set PG, the first planetary gear set PG1, and the second planetary gear set PG2.

Hereinafter, referring to FIG. 12, the exemplary power train of an automatic transmission according to the twelfth embodiment of the present invention will be described in detail.

Figure 12:
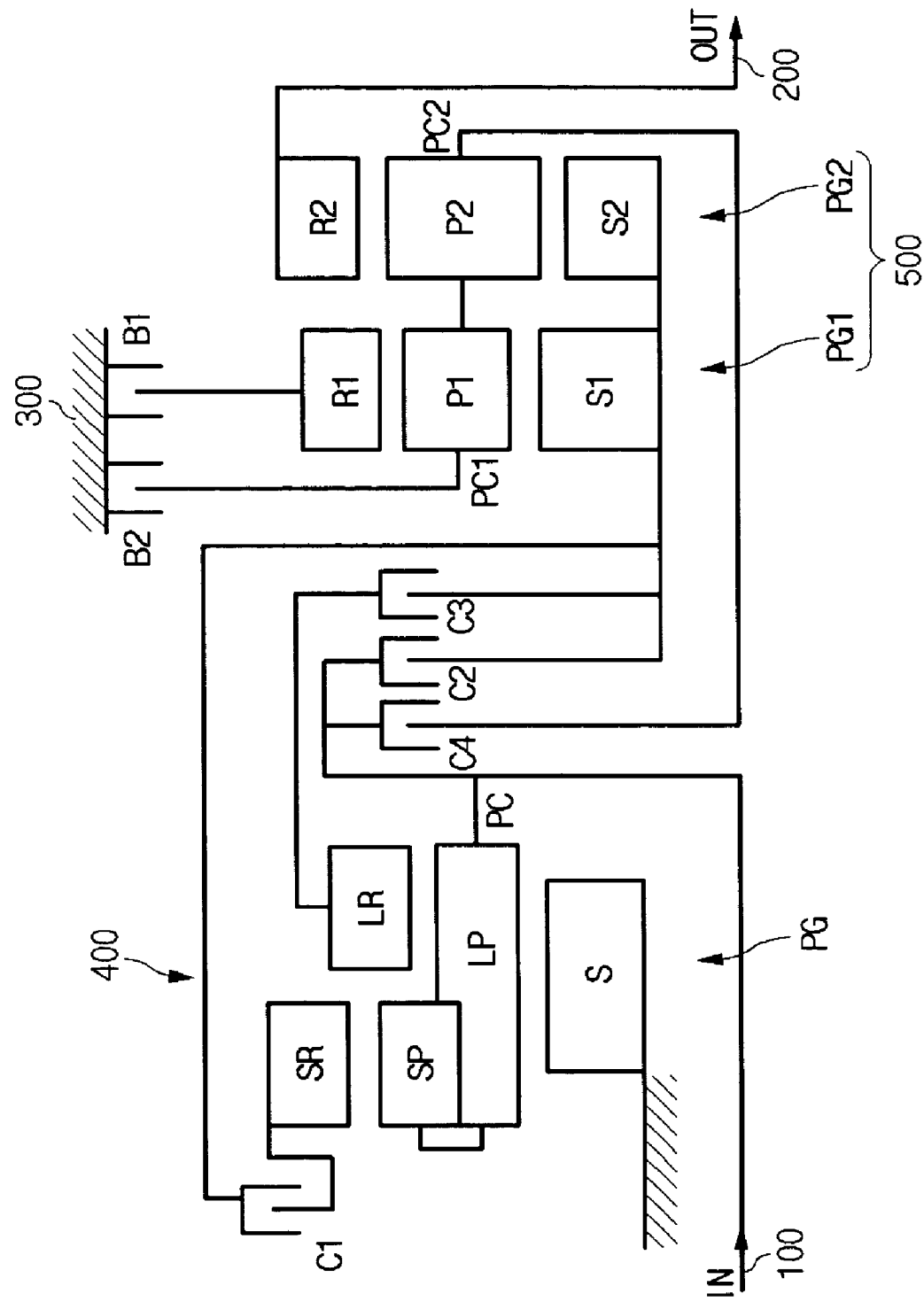
FIG. 12 is a schematic diagram of a power train of an automatic transmission according to a twelvth exemplary embodiment of the present invention.

As shown in FIG. 12, according to the twelfth exemplary embodiment of the present invention, the speed shift unit 400 includes a compound planetary gear set PG, and the output unit 500 includes first and second planetary gear sets PG1 and PG2. The compound planetary gear set PG includes a long-pinion-side ring gear LR, a short-pinion-side ring gear SR, a compound planet carrier PC, and a compound sun gear S as operational members thereof. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof.

According to the twelfth exemplary embodiment of the present invention, the speed shift unit 400 is the same as the speed shift unit 400 of the third exemplary embodiment of the present invention. Therefore, a detailed description will be omitted.

According to the twelfth exemplary embodiment of the present invention, the first sun gear S1 is fixedly connected to the second sun gear S2, and the first planet carrier PC1 is fixedly connected to the second planet carrier PC2. In addition, at least one of the fixedly connected first sun gear S1 and the second sun gear S2 is operated as the variable input member, at least one of the fixedly connected first planet carrier PC1 and the second planet carrier PC2 is operated as the variable input/stopped member, the first ring gear R1 is operated as the variably stopped member, and the second ring gear R2 is operated as the shift speed output member.

According to the twelfth exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the second brake B2 is disposed between the speed shift unit 400 and the output unit 500.

The compound planetary gear set PG and the first and second planetary gear sets PG1 and PG2 are disposed in a sequence of the compound planetary gear set PG, the first planetary gear set PG1, and the second planetary gear set PG2.

Hereinafter, referring to FIG. 13, the exemplary power train of an automatic transmission according to the thirteenth embodiment of the present invention will be described in detail.

Figure 13:
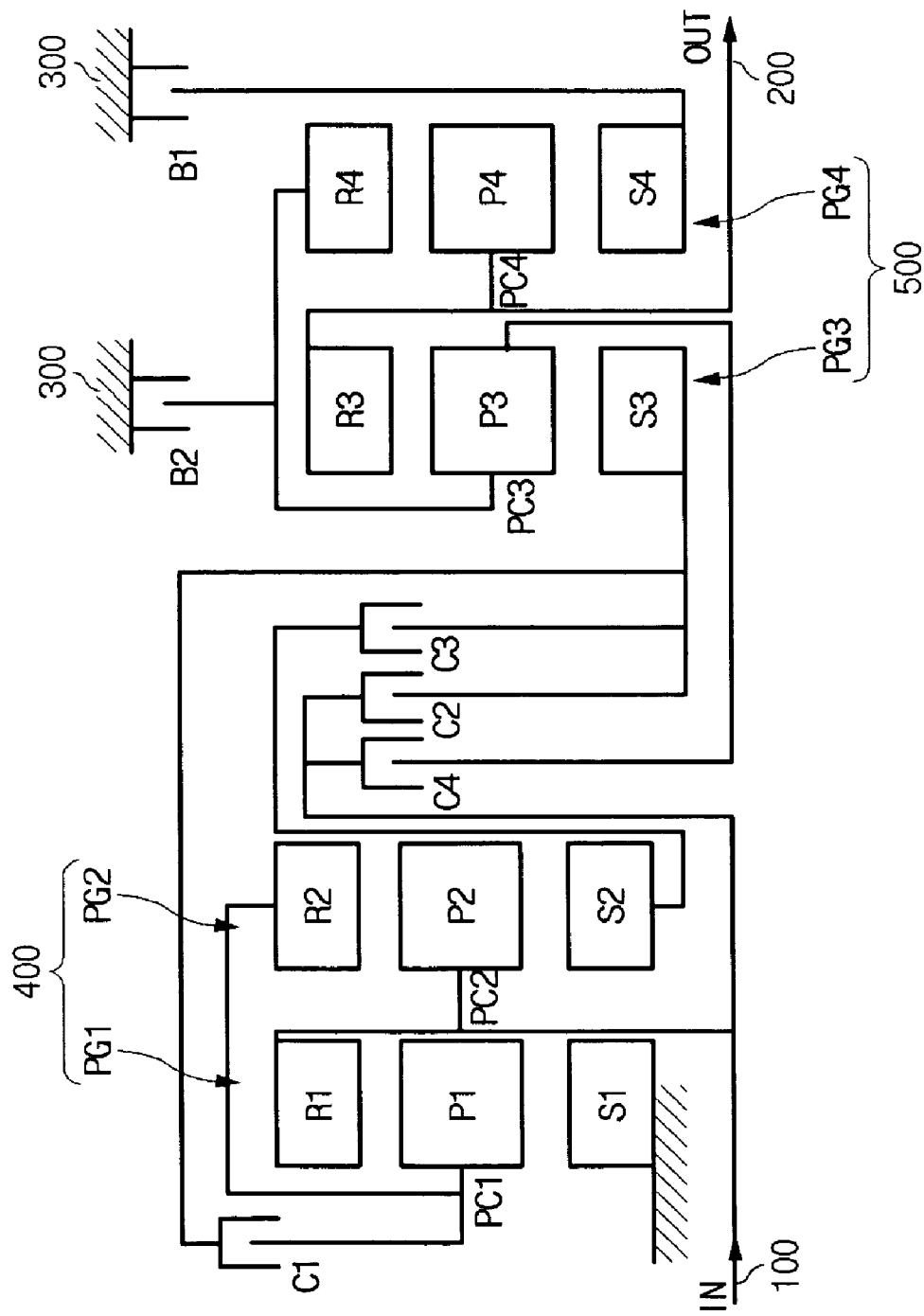
FIG. 13 is a schematic diagram of a power train of an automatic transmission according to a thirteenth exemplary embodiment of the present invention.

As shown in FIG. 13, the thirteenth exemplary embodiment of the present invention, the speed shift unit 400 includes first and second planetary gear sets PG1 and PG2, and the output unit 500 includes third and fourth planetary gear set PG3 and PG4. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof. The third planetary gear set PG3 is a single pinion planetary gear set, and includes a third sun gear S3, a third planet carrier PC3, and a third ring gear R3 as operational members thereof. The fourth planetary gear set PG4 is a single pinion planetary gear set, and includes a fourth sun gear S4, a fourth planet carrier PC4, and a fourth ring gear R4 as operational members thereof.

According to the thirteenth exemplary embodiment of the present invention, the speed shift unit 400 is the same as the speed shift unit 400 of the ninth exemplary embodiment of the present invention. Therefore, a detailed description will be omitted.

According to the thirteenth exemplary embodiment of the present invention, the third ring gear R3 is fixedly connected to the fourth planet carrier PC4, and the third planet carrier PC3 is fixedly connected to the fourth ring gear R4. In addition, the third sun gear S3 is operated as the variable input member, at least one of the fixedly connected third planet carrier PC3 and the fourth ring gear R4 is operated as the variable input/stopped member, the fourth sun gear S4 is operated as the variably stopped member, and at least one of the fixedly connected third ring gear R3 and the fourth planet carrier PC4 is operated as the shift speed output member.

According to the thirteenth exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the first brake B1 is disposed between the speed shift unit 400 and the output unit 500.

The first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

Hereinafter, referring to FIG. 14, the exemplary power train of an automatic transmission according to the fourteenth embodiment of the present invention will be described in detail.

Figure 14:
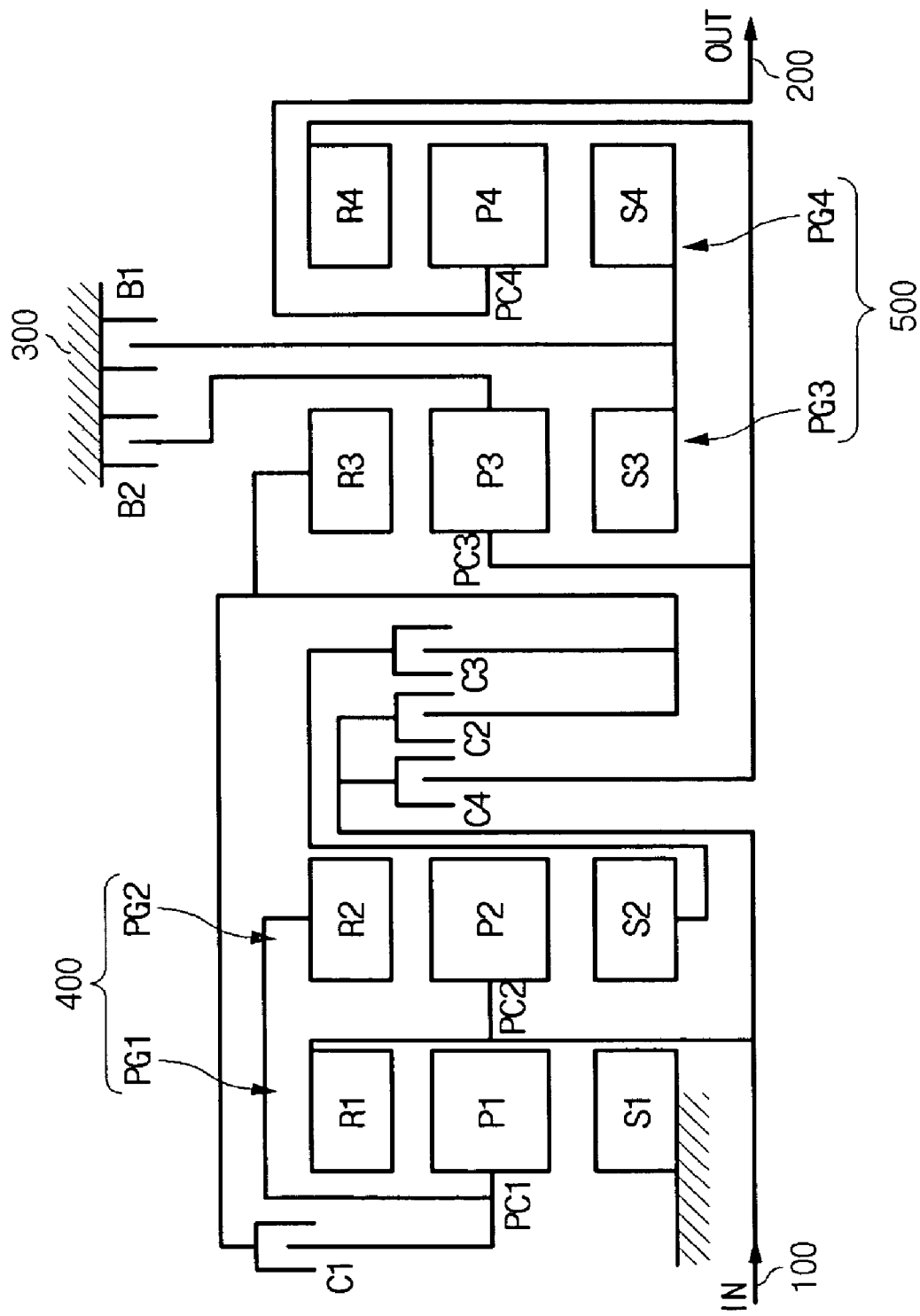
FIG. 14 is a schematic diagram of a power train of an automatic transmission according to a fourteenth exemplary embodiment of the present invention.

As shown in FIG. 14, according to the fourteenth exemplary embodiment of the present invention, the speed shift unit 400 includes first and second planetary gear sets PG1 and PG2, and the output unit 500 includes third and fourth planetary gear sets PG3 and PG4. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof. The third planetary gear set PG3 is a single pinion planetary gear set, and includes a third sun gear S3, a third planet carrier PC3, and a third ring gear R3 as operational members thereof. The fourth planetary gear set PG4 is a single pinion planetary gear set, and includes a fourth sun gear S4, a fourth planet carrier PC4, and a fourth ring gear R4 as operational members thereof.

According to the fourteenth exemplary embodiment of the present invention, the speed shift unit 400 is the same as the speed shift unit 400 of the ninth exemplary embodiment of the present invention. Therefore, a detailed description will be omitted.

According to the fourteenth exemplary embodiment of the present invention, the third sun gear S3 is fixedly connected to the fourth sun gear S4, and the third planet carrier PC3 is fixedly connected to the fourth ring gear R4. In addition, the third ring gear R3 is operated as the variable input member, at least one of the fixedly connected third planet carrier PC3 and the fourth ring gear R4 is operated as the variable input/stopped member, at least one of the fixedly connected third sun gear S3 and the fourth sun gear S4 is operated as the variably stopped member, and the fourth planet carrier PC4 is operated as the shift speed output member.

According to the fourteenth exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the first and second brakes B1 and B2 are disposed between the third planetary gear set PG3 and the fourth planetary gear set PG4.

The first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

Hereinafter, referring to FIG. 15, the exemplary power train of an automatic transmission according to the fifteenth embodiment of the present invention will be described in detail.

Figure 15:
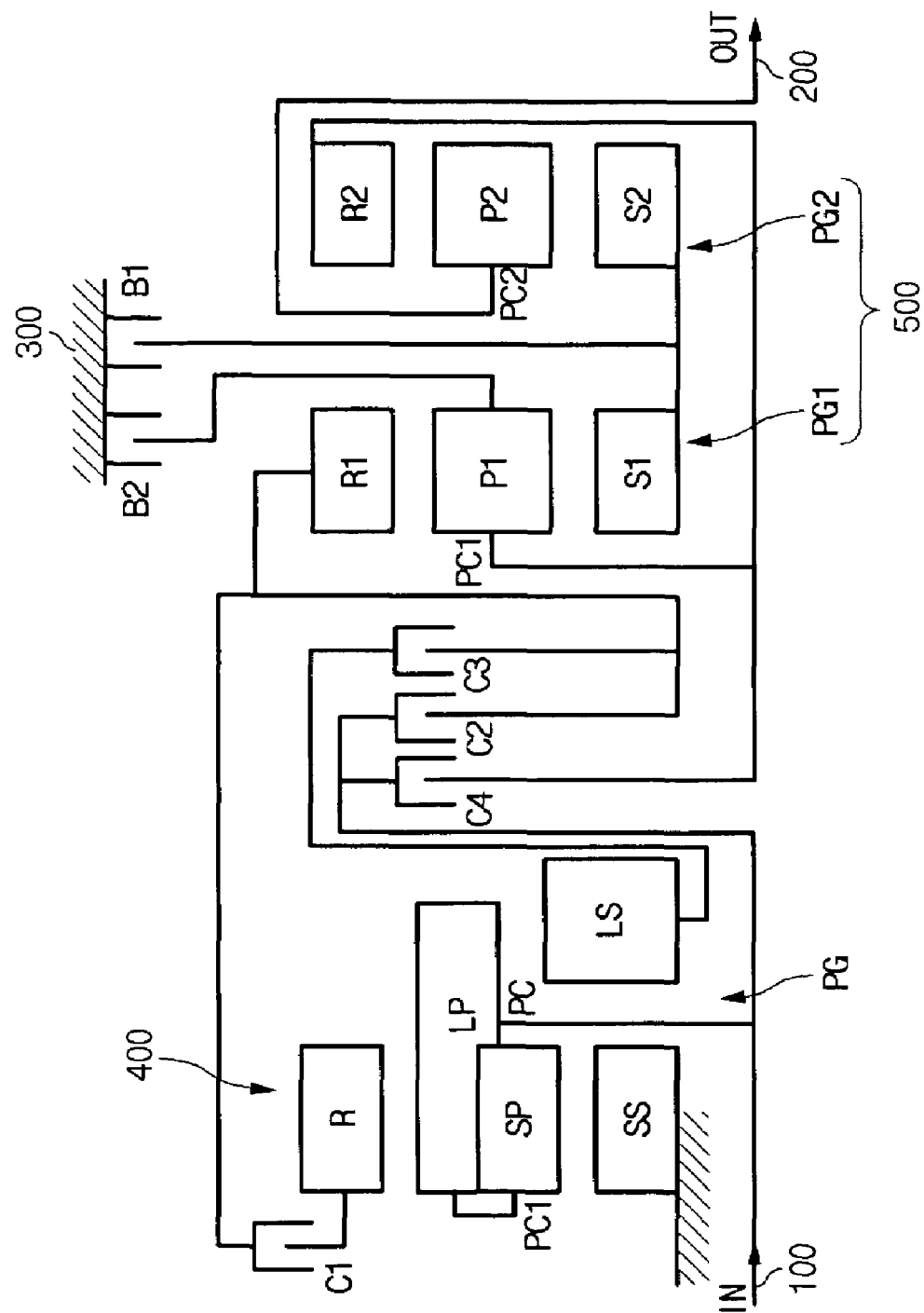
FIG. 15 is a schematic diagram of a power train of an automatic transmission according to a fifteenth exemplary embodiment of the present invention.

As shown in FIG. 15, according to the fifteenth exemplary embodiment of the present invention, the speed shift unit 400 includes a Ravigneaux planetary gear set PG, and the output unit 500 includes first and second planetary gear sets PG1 and PG2. The Ravigneaux planetary gear set PG includes a long-pinion-side sun gear LS, a short-pinion-side sun gear SS, a Ravigneaux planet carrier PC, and a Ravigneaux ring gear R as operational members thereof. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof.

According to the fifteenth exemplary embodiment of the present invention, the speed shift unit 400 is the same as the speed shift unti 400 of the eleventh exemplary embodiment of the present invention. Therefore, a detailed description will be omitted.

According to the fifteenth exemplary embodiment of the present invention, the first sun gear S1 is fixedly connected to the second sun gear S2, and the first planet carrier PC1 is fixedly connected to the second ring gear R2. In addition, the first ring gear R1 is operated as the variable input member, at least one of the fixedly connected first planet carrier PC1 and the second ring gear R2 is operated as the variable input/stopped member, at least one of the fixedly connected first sun gear S1 and the second sun gear S2 is operated as the variably stopped member, and the second planet carrier PC2 is operated as the shift speed output member.

According to the fifteenth exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the first and second brakes B1 and B2 are disposed between the first planetary gear set PG1 and the second planetary gear set PG2.

The Ravigneaux planetary gear set PG and the first and second planetary gear sets PG1 and PG2 are disposed in a sequence of the Ravigneaux planetary gear set PG, the first planetary gear set PG1, and the second planetary gear set PG2.

Hereinafter, referring to FIG. 16, the exemplary power train of an automatic transmission according to the sixteenth embodiment of the present invention will be described in detail.

Figure 16:
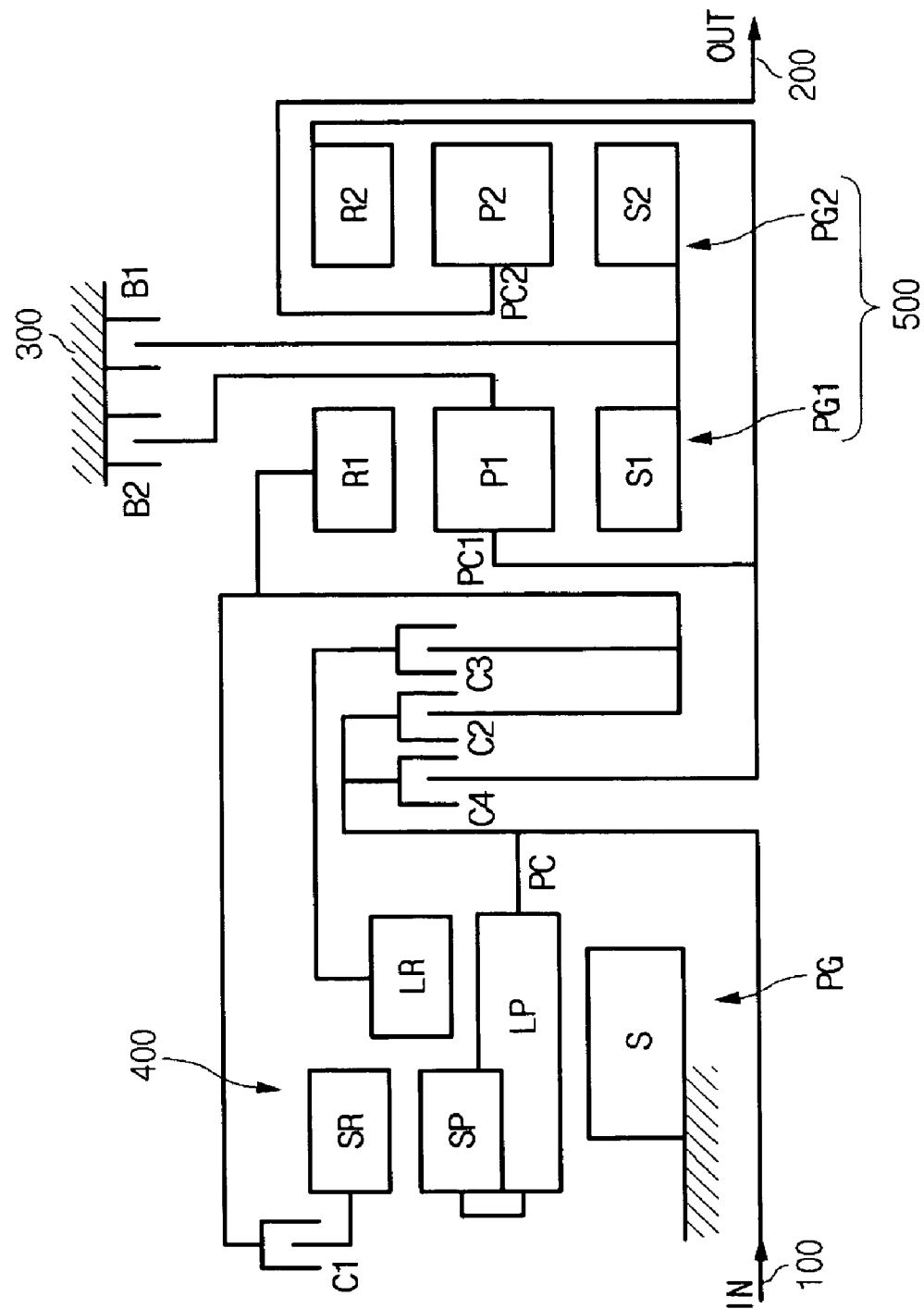
FIG. 16 is a schematic diagram of a power train of an automatic transmission according to a sixteenth exemplary embodiment of the present invention.

As shown in FIG. 16, according to the sixteenth exemplary embodiment of the present invention, the speed shift unit 400 includes a compound planetary gear set PG, and the output unit 500 includes first and second planetary gear sets PG1 and PG2. The compound planetary gear set PG includes a long-pinion-side ring gear LR, a short-pinion-side ring gear SR, a compound planet carrier PC, and a compound sun gear S as operational members thereof. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof.

According to the sixteenth exemplary embodiment of the present invention, the speed shift unit 400 is the same as the speed shift unit 400 of the third exemplary embodiment of the present invention. Therefore, a detailed description will be omitted.

According to the sixteenth exemplary embodiment of the present invention, the first sun gear S1 is fixedly connected to the second sun gear S2, and the first planet carrier PC1 is fixedly connected to the second ring gear R2. In addition, the first ring gear R1 is operated as the variable input member, at least one of the fixedly connected first planet carrier PC1 and the second ring gear R2 is operated as the variable input/stopped member, at least one of the fixedly connected first sun gear S1 and the second sun gear S2 is operated as the variably stopped member, and the second planet carrier PC2 is operated as the shift speed output member.

According to the sixteenth exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the first and second brakes B1 and B2 are disposed between the first planetary gear set PG1 and the second planetary gear set PG2.

The compound planetary gear set PG and the first and second planetary gear sets PG1 and PG2 are disposed in a sequence of the compound planetary gear set PG, the first planetary gear set PG1, and the second planetary gear set PG2.

Hereinafter, referring to FIG. 17, the exemplary power train of an automatic transmission according to the seventeenth embodiment of the present invention will be described in detail.

Figure 17:
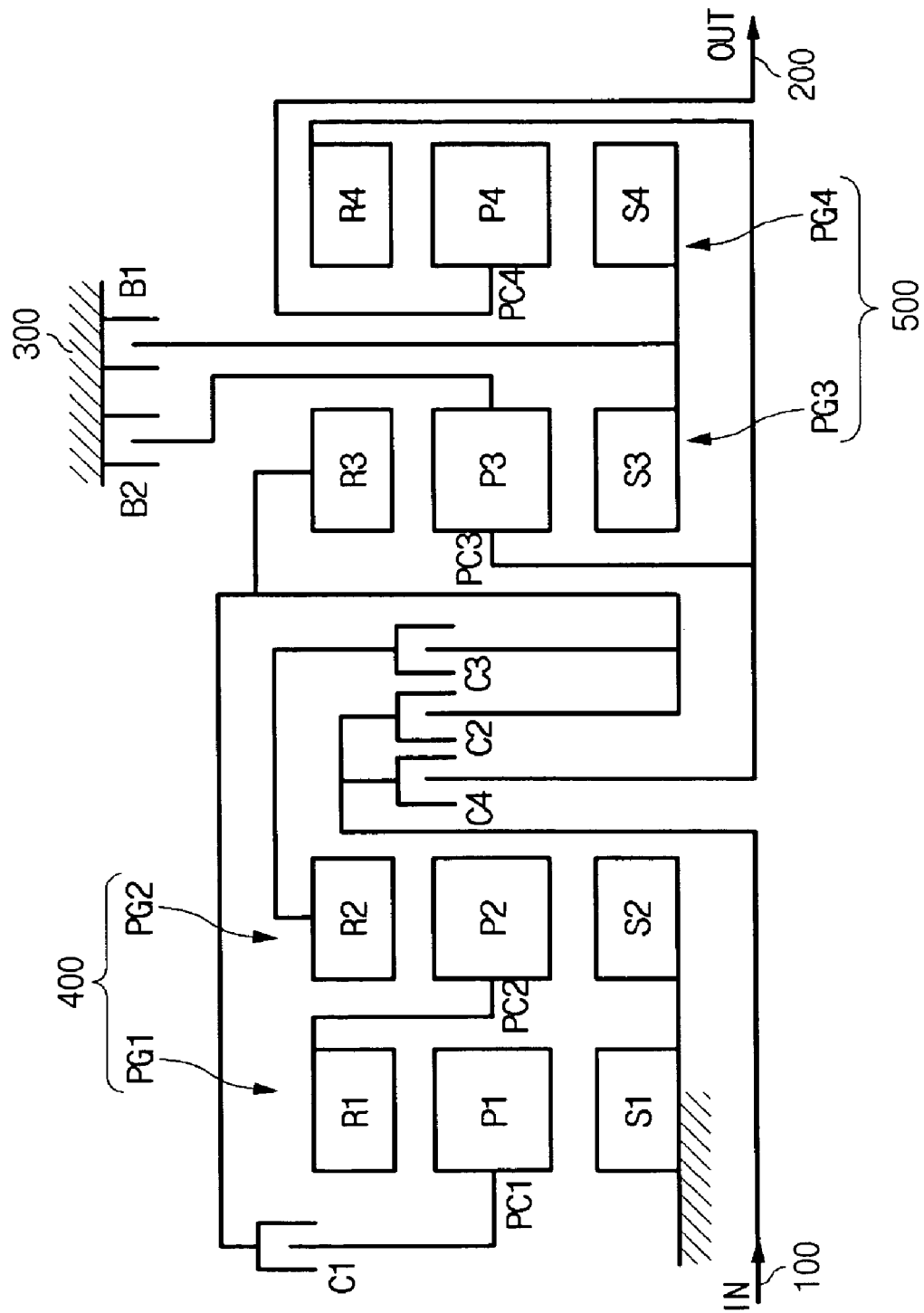
FIG. 17 is a schematic diagram of a power train of an automatic transmission according to a seventeenth exemplary embodiment of the present invention.

As shown in FIG. 17, according to the seventeenth exemplary embodiment of the present invention, the speed shift unit 400 includes first and second planetary gear sets PG1 and PG2, and the output unit 500 includes third and fourth planetary gear sets PG3 and PG4. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof. The third planetary gear set PG3 is a single pinion planetary gear set, and includes a third sun gear S3, a third planet carrier PC3, and a third ring gear R3 as operational members thereof. The fourth planetary gear set PG4 is a single pinion planetary gear set, and includes a fourth sun gear S4, a fourth planet carrier PC4, and a fourth ring gear R4 as operational members thereof.

According to the seventeenth exemplary embodiment of the present invention, the speed shift unit 400 is the same as the speed unit 400 of the first exemplary embodiment of the present invention. Therefore, a detailed description will be omitted.

According to the seventeenth exemplary embodiment of the present invention, the third sun gear S3 is fixedly connected to the fourth sun gear S4, and the third planet carrier PC3 is fixedly connected to the fourth ring gear R4. In addition, the third ring gear R3 is operated as the variable input member, at least one of the fixedly connected third planet carrier PC3 and the fourth ring gear R4 is operated as the variable input/stopped member, at least one of the fixedly connected third sun gear S3 and the fourth sun gear S4 is operated as the variably stopped member, and the fourth planet carrier PC4 is operated as the shift speed output member.

According to the seventeenth exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the first and second brakes B1 and B2 are disposed between the third planetary gear set PG3 and the fourth planetary gear set PG4.

The first, second, third, and fourth planetary gear sets PG1, PG2, PG3, and PG4 are disposed in a sequence of the first planetary gear set PG1, the second planetary gear set PG2, the third planetary gear set PG3, and the fourth planetary gear set PG4.

Hereinafter, referring to FIG. 18, the exemplary power train of an automatic transmission according to the eighteenth embodiment of the present invention will be described in detail.

Figure 18:
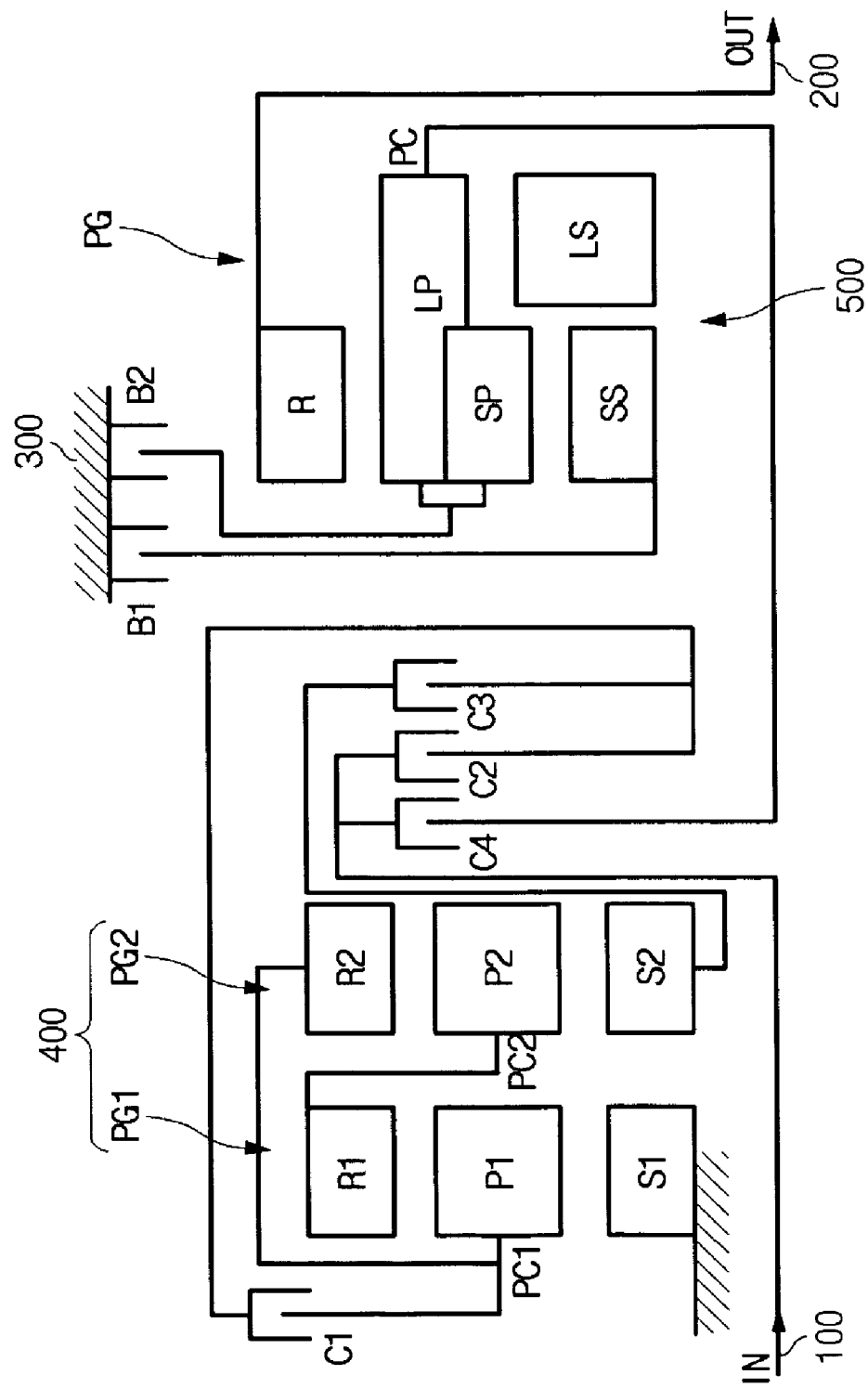
FIG. 18 is a schematic diagram of a power train of an automatic transmission according to an eighteenth exemplary embodiment of the present invention.

As shown in FIG. 18, the eighteenth exemplary embodiment of the present invention, the speed shift unit 400 includes first and second planetary gear sets PG1 and PG2, and the output unit 500 includes a Ravigneaux planetary gear set PG. The first planetary gear set PG1 is a single pinion planetary gear set, and includes a first sun gear S1, a first planet carrier PC1, and a first ring gear R1 as operational members thereof. The second planetary gear set PG2 is a single pinion planetary gear set, and includes a second sun gear S2, a second planet carrier PC2, and a second ring gear R2 as operational members thereof. The Ravigneaux planetary gear set PG includes a long-pinion-side sun gear LS, a short-pinion-side sun gear SS, a Ravigneaux planet carrier PC, and a Ravigneaux ring gear R as operational members thereof.

According to the eighteenth exemplary embodiment of the present invention, the speed shift unit 400 is the same as the speed shift unit 400 of the ninth exemplary embodiment of the present invention. Therefore, a detailed description will be omitted.

According to the eighteenth exemplary embodiment of the present invention, the long-pinion-side sun gear LS is operated as the variable input member, the Ravigneaux planet carrier PC is operated as the variable input/stopped member, the short-pinion-side sun gear SS is operated as the variably stopped member, and the Ravigneaux ring gear R is operated as the shift speed output member.

According to the eighteenth exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the first and second brakes B1 and B2 are disposed between the speed shift unit 400 and the output unit 500.

The first and second planetary gear sets PG1 and PG2 and the Ravigneaux planetary gear set PG are disposed in as sequence of the first planetary gear set PG1, the second planetary gear set PG2, and the Ravigneaux planetary gear set PG.

Hereinafter, referring to FIG. 19, the exemplary power train of an automatic transmission according to the nineteenth embodiment of the present invention will be described in detail.

Figure 19:
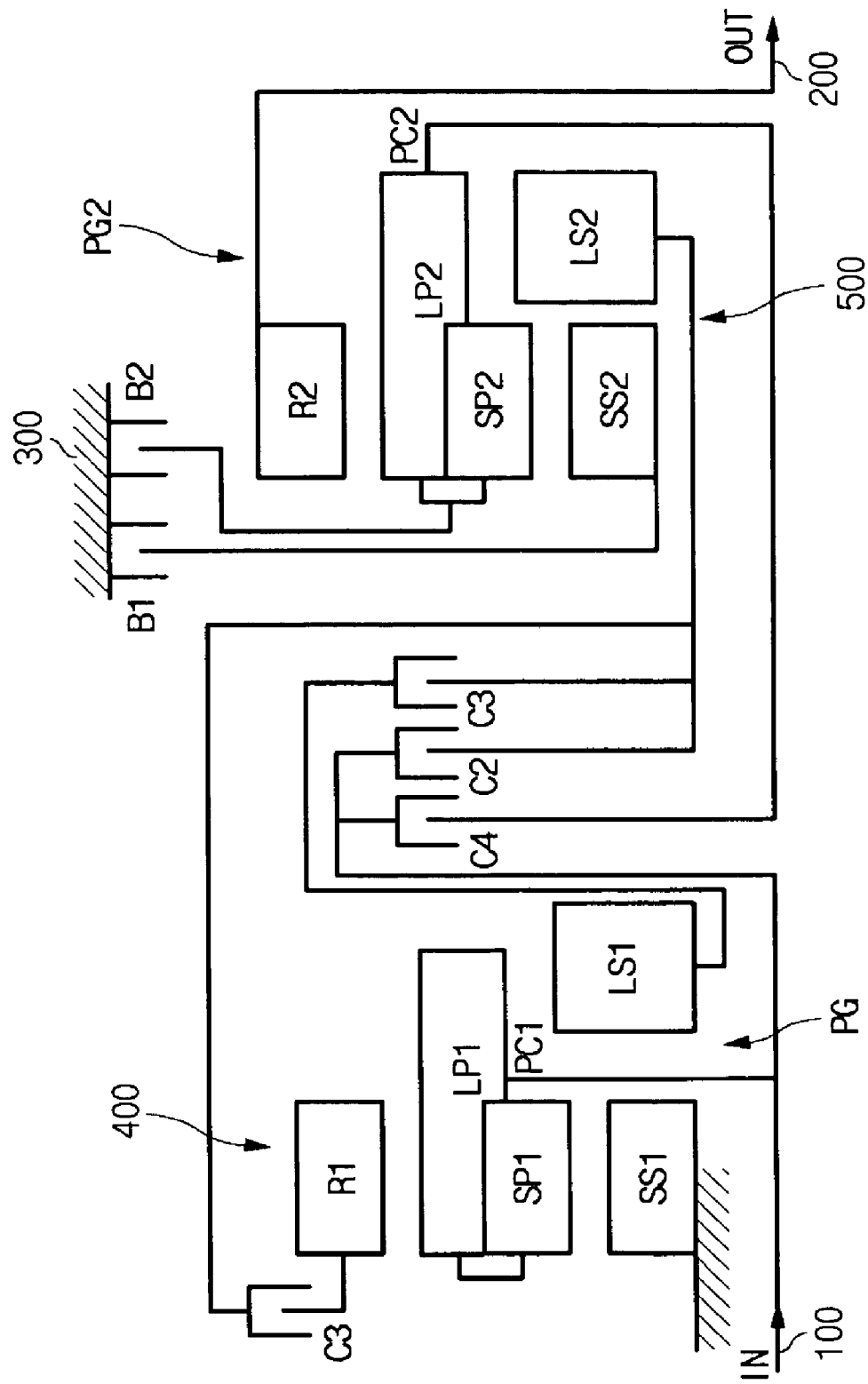
FIG. 19 is a schematic diagram of a power train of an automatic transmission according to a ninteenth exemplary embodiment of the present invention.

As shown in FIG. 19, according to the nineteenth exemplary embodiment of the present invention, the speed shift unit 400 includes a first Ravigneaux planetary gear set PG1, and the output unit 500 includes a second Ravigneaux planetary gear set PG2. The first Ravigneaux planetary gear set PG1 includes a first long-pinion-side sun gear LS1, a first short-pinion-side sun gear SS1, a first Ravigneaux planet carrier PC1, and a first Ravigneaux ring gear R1 as operational members thereof. The second Ravigneaux planetary gear set PG2 includes a second long-pinion-side sun gear LS2, a second short-pinion-side sun gear SS2, a second Ravigneaux planet carrier PC2, and a second Ravigneaux ring gear R2 as operational members thereof.

According to the nineteenth exemplary embodiment of the present invention, the first Ravigneaux planet carrier PC1 is operated as the fixed input member, the first short-pinion-side sun gear SS1 is operated as the fixedly stopped member, the first Ravigneaux ring gear R1 is operated as the reduced speed output member, and the first long-pinion-side sun gear LS1 is operated as the increased speed output member.

In addition, the second long-pinion-side sun gear LS2 is operated as the variable input member, the second Ravigneaux planet carrier PC2 is operated as the variable input/stopped member, the second short-pinion-side sun gear SS2 is operated as the variably stopped member, and the second Ravigneaux ring gear R2 is operated as the shift speed output member.

According to the nineteenth exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the first and second brakes B1 and B2 are disposed between the speed shift unit 400 and the output unit 500.

The first Ravigneaux planetary gear set PG1 and the second Ravigneaux planetary gear set PG2 are disposed in a sequence of the first Ravigneaux planetary gear set PG1 and the second Ravigneaux planetary gear set PG2.

Hereinafter, referring to FIG. 20, the exemplary power train of an automatic transmission according to the twentieth embodiment of the present invention will be described in detail.

Figure 20:
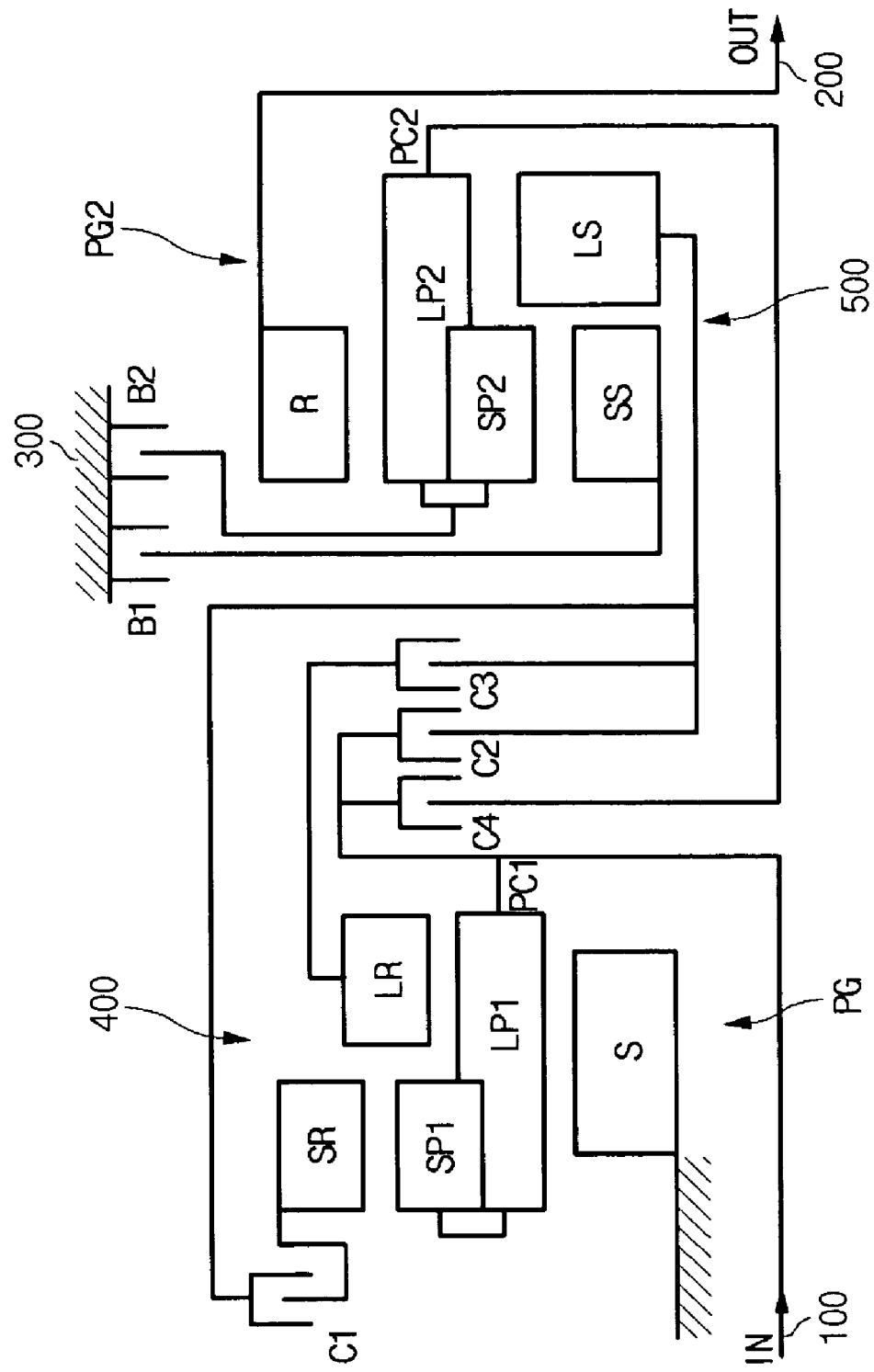
FIG. 20 is a schematic diagram of a power train of an automatic transmission according to a twentieth exemplary embodiment of the present invention.

As shown in FIG. 20, according to the twentieth exemplary embodiment of the present invention, the speed shift unit 400 includes a compound planetary gear set PG1, and the output unit 500 includes a Ravigneaux planetary gear set PG2. The compound planetary gear set PG1 includes a long-pinion-side ring gear LR, a short-pinion-side ring gear SR, a compound planet carrier PC1, and a compound sun gear S as operational members thereof. The Ravigneaux planetary gear set PG2 includes a long-pinion-side sun gear LS, a short-pinion-side sun gear SS, a Ravigneaux planet carrier PC2, and a Ravigneaux ring gear R as operational members thereof.

According to the twentieth exemplary embodiment of the present invention, the compound planet carrier PC1 is operated as the fixed input member, the compound sun gear S is operated as the fixedly stopped member, the short-pinion-side ring gear SR is operated as the reduced speed output member, and the long-pinion-side ring gear LR is operated as the increased speed output member.

In addition, the long-pinion-side sun gear LS is operated as the variable input member, the Ravigneaux planet carrier PC2 is operated as the variable input/stopped member, the short-pinion-side sun gear SS is operated as the variably stopped member, and the Ravigneaux ring gear R is operated as the shift speed output member.

According to the twentieth exemplary embodiment of the present invention, the first clutch C1 is disposed on an opposite side to the output unit 500 with reference to the speed shift unit 400, and the second, third, and fourth clutches C2, C3, and C4 are disposed between the speed shift unit 400 and the output unit 500. In addition, the first and second brakes B1 and B2 are disposed between the speed shift unit 400 and the output unit 500.

The compound planetary gear set PG1 and the Ravigneaux planetary gear set PG2 are disposed in a sequence of the compound planetary gear set PG1 and the Ravigneaux planetary gear set PG2.

Operations, shifting processes, and formations of each speed of the power trains according to the second through twentieth embodiments of the present invention are similar to those of the power train according to the first embodiment of the present invention, and may be easily obtained by a person of an ordinary skill in the art based on the teachings herein. Thus, a detailed explanation thereof will be omitted.

According to the exemplary embodiments of the present invention, seven forward speeds and three reverse speeds may be realized.

In addition, according to the exemplary embodiments of the present invention, skip up-shifting and skip down-shifting may be facilitated by reducing frictional members engaged or released in a skip shifting process.

In addition, according to the exemplary embodiments of the present invention, the length of an automatic transmission may be reduced by effectively arranging clutches and brakes.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power train of an automatic transmission, comprising:
an input shaft;
an output gear;
a transmission case;
a speed shift unit comprising a fixed input member that is fixedly connected to the input shaft, a fixedly stopped member that is fixedly connected to the transmission case, an increased speed output member that outputs an increased rotational speed, and a reduced speed output member that outputs a reduced rotational speed;
an output unit comprising a variable input member that is variably connected to the input shaft, the increased speed output member, and the reduced speed output member, a variable input/stopped member that is variably connected to the input shaft or is variably connected to the transmission case, a variably stopped member that is variably connected to the transmission case, and a shift speed output member that acts as an output member by being fixedly connected to the output gear, wherein the output unit generates seven forward speeds and three reverse speeds at the shift speed output member by operations of the variable input member, the variable input/stopped member, and the variably stopped member;
a first clutch for variably connecting the variable input member to the reduced speed output member;
a second clutch for variably connecting the variable input member to the input shaft;
a third clutch for variably connecting the variable input member to the increased speed output member;
a fourth clutch for variably connecting the variable input/stopped member to the input shaft;
a first brake for variably stopping the variably stopped member; and
a second brake for variably stopping the variable input/stopped member.

2. The power train of claim 1, wherein the speed shift unit comprises:
a first planetary gear set having a first sun gear, a first planet carrier, and a first ring gear as operational members thereof; and
a second planetary gear set having a second sun gear, a second planet carrier, and a second ring gear as operational members thereof,
wherein the first ring gear is fixedly connected to the second planet carrier,
the first sun gear is fixedly connected to the second sun gear,
at least one of the fixedly connected first ring gear and the second planet carrier is operated as the fixed input member,
at least one of the fixedly connected first sun gear and the second sun gear is operated as the fixedly stopped member,
the first planet carrier is operated as the reduced speed output member, and
the second ring gear is operated as the increased speed output member.

3. The power train of claim 2, wherein the output unit comprises:

a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third ring gear is fixedly connected to the fourth planet carrier, the third planet carrier is fixedly connected to the fourth ring gear, the third sun gear is operated as the variable input member, at least one of the fixedly connected third planet carrier and the fourth ring gear is operated as the variable input/stopped member, the fourth sun gear is operated as the variably stopped member, and at least one of the fixedly connected third ring gear and the fourth planet carrier is operated as the shift speed output member.

4. The power train of claim 3, wherein the first clutch is disposed on an opposite side to the output unit with reference to the speed shift unit.

5. The power train of claim 3, wherein the second, third, and fourth clutches are disposed between the speed shift unit and the output unit.

6. The power train of claim 3, wherein the first brake is disposed on an opposite side to the speed shift unit with reference to the output unit.

7. The power train of claim 3, wherein the first, second, third, and fourth planetary gear sets are dispose in a sequence of the first planetary gear set, the second planetary gear set, the third planetary gear set, and the fourth planetary gear set.

8. The power train of claim 3, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

9. The power train of claim 1, wherein the speed shift unit comprises a Ravigneaux planetary gear set having a long-pinion-side sun gear, a short-pinion-side sun gear, a Ravigneaux planet carrier, and a Ravigneaux ring gear as operational members thereof,
wherein the Ravigneaux ring gear is operated as the fixed input member,
the long-pinion-side sun gear is operated as the fixedly stopped member,
the Ravigneaux planet carrier is operated as the reduced speed output member, and
the short-pinion-side sun gear is operated as the increased speed output member.

10. The power train of claim 9, wherein the output unit comprises:
a first planetary gear set having a first sun gear, a first planet carrier, and a first ring gear as operational members thereof; and
a second planetary gear set having a second sun gear, a second planet carrier, and a second ring gear as operational members thereof,
wherein the first ring gear is fixedly connected to the second planet carrier,
the first planet carrier is fixedly connected to the second ring gear,
the first ring gear is operated as the variable input member,
at least one of the fixedly connected first planet carrier and the second ring gear is operated as the variable input/stopped member,
the second sun gear is operated as the variably stopped member, and
at least one of the fixedly connected first ring gear and the second planet carrier is operated as the shift speed output member.

11. The power train of claim 10, wherein the first and third clutches are disposed on an opposite side to the output unit with reference to the speed shift unit.

12. The power train of claim 10, wherein the second and fourth clutches are disposed between the speed shift unit and the output unit.

13. The power train of claim 10, wherein the first brake is disposed on an opposite side to the speed shift unit with reference to the output unit.

14. The power train of claim 10, wherein the Ravigneaux planetary gear set and the first and second planetary gear sets are disposed in a sequence of the Ravigneaux planetary gear set, the first planetary gear set, and the second planetary gear set.

15. The power train of claim 10, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

16. The power train of claim 1, wherein the speed shift unit comprises a compound planetary gear set having a short-pinion-side ring gear, a long-pinion-side ring gear, a compound planet carrier, and a compound sun gear as operational members thereof,
wherein the compound planet carrier is operated as the fixed input member,
the compound sun gear is operated as the fixedly stopped member,
the short-pinion-side ring gear is operated as the reduced speed output member, and the long-pinion-side ring gear is operated as the increased speed output member.

17. The power train of claim 16, wherein the output unit comprises:
a first planetary gear set having a first sun gear, a first planet carrier, and a first ring gear as operational members thereof; and
a second planetary gear set having a second sun gear, a second planet carrier, and a second ring gear as operational members thereof,
wherein the first ring gear is fixedly connected to the second planet carrier,
the first planet carrier is fixedly connected to the second ring gear,
the first sun gear is operated as the variable input member,
at least one of the fixedly connected first planet carrier and the second ring gear is operated as the variable input/stopped member,
the second sun gear is operated as the variably stopped member, and
at least one of the fixedly connected first ring gear and the second planet carrier is operated as the shift speed output member.

18. The power train of claim 17, wherein the first clutch is disposed on an opposite side to the output unit with reference to the speed shift unit.

19. The power train of claim 17, wherein the second, third, and fourth clutches are disposed between the speed shift unit and the output unit.

20. The power train of claim 17, wherein the first brake is disposed on an opposite side to the speed shift unit with reference to the output unit.

21. The power train of claim 17, wherein the compound planetary gear set and the first and second planetary gear sets are disposed in a sequence of the compound planetary gear set, the first planetary gear set, and the second planetary gear set.

22. The power train of claim 17, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

23. The power train of claim 1, wherein the speed shift unit comprises:
a first planetary gear set having a first sun gear, a first planet carrier, and a first ring gear as operational members thereof; and
a second planetary gear set having a second sun gear, a second planet carrier, and a second ring gear as operational members thereof,
wherein the first planet carrier is fixedly connected to the second planet carrier,
the first sun gear is fixedly connected to the second sun gear,
the second ring gear is operated as the fixed input member,
at least one of the fixedly connected first sun gear and the second sun gear is operated as the fixedly stopped member,
at least one of the fixedly connected first planet carrier and the second planet carrier is operated as the reduced speed output member, and
the first ring gear is operated as the increased speed output member.

24. The power train of claim 23, wherein the output unit comprises:
a third planetary gear set having a third sun gear, a third planet carrier, and a third ring gear as operational members thereof; and
a fourth planetary gear set having a fourth sun gear, a fourth planet carrier, and a fourth ring gear as operational members thereof,
wherein the third ring gear is fixedly connected to the fourth planet carrier,
the third planet carrier is fixedly connected to the fourth ring gear,
the third sun gear is operated as the variable input member,
at least one of the fixedly connected third planet carrier and the fourth ring gear is operated as the variable input/stopped member,
the fourth sun gear is operated as the variably stopped member, and
at least one of the fixedly connected third ring gear and the fourth planet carrier is operated as the shift speed output member.

25. The power train of claim 24, wherein the first and third clutches are disposed on an opposite side to the output unit with reference to the speed shift unit.

26. The power train of claim 24, wherein the second and fourth clutches are disposed between the speed shift unit and the output unit.

27. The power train of claim 24, wherein the first brake is disposed on an opposite side to the speed shift unit with reference to the output unit.

28. The power train of claim 24, wherein the first, second, third, and fourth planetary gear sets are disposed in a sequence of the first planetary gear set, the second planetary gear set, the third planetary gear set, and the fourth planetary gear set.

29. The power train of claim 24, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and the third clutch and the second brake are operated in a third reverse speed.

30. The power train of claim 2, wherein the output unit comprises a Ravigneaux planetary gear set having a long-pinion-side sun gear, a short-pinion-side sun gear, a Ravigneaux planet carrier, and a Ravigneaux ring gear as operational members thereof,
wherein the long-pinion-side sun gear is operated as the variable input member,
the Ravigneaux planet carrier is operated as the variable input/stopped member,
the short-pinion-side sun gear is operated as the variably stopped member, and
the Ravigneaux ring gear is operated as the shift speed output member.

31. The power train of claim 30, wherein the first clutch is disposed on an opposite side to the output unit with reference to the speed shift unit.

32. The power train of claim 30, wherein the second, third, and fourth clutches are disposed between the speed shift unit and the output unit.

33. The power train of claim 30, wherein the first and second brakes are disposed between the speed shift unit and the output unit.

34. The power train of claim 30, wherein the first and second planetary gear sets and the Ravigneaux planetary gear set are disposed in a sequence of the first planetary gear set, the second planetary gear set, and the Ravigneaux planetary gear set.

35. The power train of claim 30, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

36. The power train of claim 23, wherein the output unit comprises a Ravigneaux planetary gear set having a long-pinion-side sun gear, a short-pinion-side sun gear, a Ravigneaux planet carrier, and a Ravigneaux ring gear as operational members thereof,
wherein the long-pinion-side sun gear is operated as the variable input member,
the Ravigneaux planet carrier is operated as the variable input/stopped member,
the short-pinion-side sun gear is operated as the variably stopped member,
the Ravigneaux ring gear is operated as the shift speed output member.

37. The power train of claim 36, wherein the first and third clutches are disposed on an opposite side to the output unit with reference to the speed shift unit.

38. The power train of claim 36, wherein the second and fourth clutches are disposed between the speed shift unit and the output unit.

39. The power train of claim 36, wherein the first and second brakes are disposed between the speed shift unit and the output unit.

40. The power train of claim 36, wherein the first and second planetary gear sets and the Ravigneaux planetary gear set are disposed in a sequence of the first planetary gear set, the second planetary gear set, and the Ravigneaux planetary gear set.

41. The power train of claim 36, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

42. The power train of claim 23, wherein the output unit comprises:
a third planetary gear set having a third sun gear, a third planet carrier, and a third ring gear as operational members thereof; and
a fourth planetary gear set having a fourth sun gear, a fourth planet carrier, and a fourth ring gear as operational members thereof,
wherein the third sun gear is fixedly connected to the fourth sun gear,
the third planet carrier is fixedly connected to the fourth ring gear,
the third ring gear is operated as the variable input member,
at least one of the fixedly connected third planet carrier and the fourth ring gear is operated as the variable input/stopped member,
at least one of the fixedly connected third sun gear and the fourth sun gear is operated as the variably stopped member, and
the fourth planet carrier is operated as the shift speed output member.

43. The power train of claim 42, wherein the first and third clutches are disposed on an opposite side to the output unit with reference to the speed shift unit.

44. The power train of claim 42, wherein the second and fourth clutches are disposed between the speed shift unit and the output unit.

45. The power train of claim 42, wherein the first and second brakes are disposed between the third planetary gear set and the fourth planetary gear set.

46. The power train of claim 42, wherein the first, second, third, and fourth planetary gear sets are disposed in a sequence of the first planetary gear set, the second planetary gear set, the third planetary gear set, and the fourth planetary gear set.

47. The power train of claim 42, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

48. The power train of claim 2, wherein the output unit comprises:
a third planetary gear set having a third sun gear, a third planet carrier, and a third ring gear as operational members thereof; and
a fourth planetary gear set having a fourth sun gear, a fourth planet carrier, and a fourth ring gear as operational members thereof,
wherein the third sun gear is fixedly connected to the fourth sun gear,
the third planet carrier is fixedly connected to the fourth planet carrier,
at least one of the fixedly connected third sun gear and the fourth sun gear is operated as the variable input member,
at least one of the fixedly connected third planet carrier and the fourth planet carrier is operated as the variable input/stopped member,
the third ring gear is operated as the variably stopped member, and
the fourth ring gear is operated as the shift speed output member.

49. The power train of claim 48, wherein the first clutch is disposed on an opposite side to the output unit with reference to the speed shift unit.

50. The power train of claim 48, wherein the second, third, and fourth clutches are disposed between the speed shift unit and the output unit.

51. The power train of claim 48, wherein the second brake is disposed between the speed shift unit and the output unit.

52. The power train of claim 48, wherein the first, second, third, and fourth planetary gear sets are disposed in a sequence of the first planetary gear set, the second planetary gear set, the third planetary gear set, and the fourth planetary gear set.

53. The power train of claim 48, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

54. The power train of claim 1, wherein the speed shift unit comprises:
a first planetary gear set having a first sun gear, a first planet carrier, and a first ring gear as operational members thereof; and
a second planetary gear set having a second sun gear, a second planet carrier, and a second ring gear as operational members thereof,
wherein the first ring gear is fixedly connected to the second planet carrier,
the first planet carrier is fixedly connected to the second ring gear,
at least one of the fixedly connected first ring gear and the second planet carrier is operated as the fixed input member,
the first sun gear is operated as the fixedly stopped member,
at least one of the fixedly connected first planet carrier and the second ring gear is operated as the reduced speed output member, and
the second sun gear is operated as the increased speed output member.

55. The power train of claim 54, wherein the output unit comprises:
a third planetary gear set having a third sun gear, a third planet carrier, and a third ring gear as operational members thereof; and
a fourth planetary gear set having a fourth sun gear, a fourth planet carrier, and a fourth ring gear as operational members thereof,
wherein the third sun gear is fixedly connected to the fourth sun gear,
the third planet carrier is fixedly connected to the fourth planet carrier,
at least one of the fixedly connected third sun gear and the fourth sun gear is operated as the variable input member,
at least one of the fixedly connected third planet carrier and the fourth planet carrier is operated as the variable input/stopped member,
the third ring gear is operated as the variably stopped member, and
the fourth ring gear is operated as the shift speed output member.

56. The power train of claim 55, wherein the first clutch is disposed on an opposite side to the output unit with reference to the speed shift unit.

57. The power train of claim 55, wherein the second, third, and fourth clutches are disposed between the speed shift unit and the output unit.

58. The power train of claim 55, wherein the second brake is disposed between the speed shift unit and the output unit.

59. The power train of claim 55, wherein the first, second, third, and fourth planetary gear sets are disposed in a sequence of the first planetary gear set, the second planetary gear set, the third planetary gear set, and the fourth planetary gear set.

60. The power train of claim 55, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

61. The power train of claim 23, wherein the output unit comprises:
a third planetary gear set having a third sun gear, a third planet carrier, and a third ring gear as operational members thereof; and
a fourth planetary gear set having a fourth sun gear, a fourth planet carrier, and a fourth ring gear as operational members thereof,
wherein the third sun gear is fixedly connected to the fourth sun gear,
the third planet carrier is fixedly connected to the fourth planet carrier,
at least one of the fixedly connected third sun gear and the fourth sun gear is operated as the variable input member,
at least one of the fixedly connected third planet carrier and the fourth planet carrier is operated as the variable input/stopped member,
the third ring gear is operated as the variably stopped member, and
the fourth ring gear is operated as the shift speed output member.

62. The power train of claim 61, wherein the first and third clutches are disposed on an opposite side to the output unit with reference to the speed shift unit.

63. The power train of claim 61, wherein the second and fourth clutches are disposed between the speed shift unit and the output unit.

64. The power train of claim 61, wherein the second brake is disposed between the speed shift unit and the output unit.

65. The power train of claim 61, wherein the first, second, third, and fourth planetary gear sets are disposed in a sequence of the first planetary gear set, the second planetary gear set, the third planetary gear set, and the fourth planetary gear set.

66. The power train of claim 61, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

67. The power train of claim 1, wherein the speed shift unit comprises a Ravigneaux planetary gear set having a long-pinion-side sun gear, a short-pinion-side sun gear, a Ravigneaux planet carrier, and a Ravigneaux ring gear as operational members thereof,
wherein the Ravigneaux planet carrier is operated as the fixed input member,
the short-pinion-side sun gear is operated as the fixedly stopped member,
the Ravigneaux ring gear is operated as the reduced speed output member, and
the long-pinion-side sun gear is operated as the increased speed output member.

68. The power train of claim 67, wherein the output unit comprises:
a first planetary gear set having a first sun gear, a first planet carrier, and a first ring gear as operational members thereof; and
a second planetary gear set having a second sun gear, a second planet carrier, and a second ring gear as operational members thereof,
wherein the first sun gear is fixedly connected to the second sun gear,
the first planet carrier is fixedly connected to the second planet carrier,
at least one of the fixedly connected first sun gear and the second sun gear is operated as the variable input member,
at least one of the fixedly connected first planet carrier and the second planet carrier is operated as the variable input/stopped member,
the first ring gear is operated as the variably stopped member, and
the second ring gear is operated as the shift speed output member.

69. The power train of claim 68, wherein the first clutch is disposed on an opposite side to the output unit with reference to the speed shift unit.

70. The power train of claim 68, wherein the second, third, and fourth clutches are disposed between the speed shift unit and the output unit.

71. The power train of claim 68, wherein the second brake is disposed between the speed shift unit and the output unit.

72. The power train of claim 68, wherein the Ravigneaux planetary gear set and the first and second planetary gear sets are disposed in a sequence of the Ravigneaux planetary gear set, the first planetary gear set, and the second planetary gear set.

73. The power train of claim 68, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed, the third and fourth clutches are operated in a fifth forward speed, the second and fourth clutches are operated in a sixth forward speed, the first and fourth clutches are operated in a seventh forward speed, the first clutch and the second brake are operated in a first reverse speed, the second clutch and the second brake are operated in a second reverse speed, and the third clutch and the second brake are operated in a third reverse speed.

74. The power train of claim 16, wherein the output unit comprises:

a first planetary gear set having a first sun gear, a first planet carrier, and a first ring gear as operational members thereof; and a second planetary gear set having a second sun gear, a second planet carrier, and a second ring gear as operational members thereof, wherein the first sun gear is fixedly connected to the second sun gear, the first planet carrier is fixedly connected to the second planet carrier, at least one of the fixedly connected first sun gear and the second sun gear is operated as the variable input member, at least one of the fixedly connected first planet carrier and the second planet carrier is operated as the variable input/stopped member, the first ring gear is operated as the variably stopped member, and the second ring gear is operated as the shift speed output member.

75. The power train of claim 74, wherein the first clutch is disposed on an opposite side to the output unit with reference to the speed shift unit.

76. The power train of claim 74, wherein the second, third, and fourth clutches are disposed between the speed shift unit and the output unit.

77. The power train of claim 74, wherein the second brake is disposed between the speed shift unit and the output unit.

78. The power train of claim 74, wherein the compound planetary gear set and the first and second planetary gear sets are disposed in a sequence of the compound planetary gear set, the first planetary gear set, and the second planetary gear set.

79. The power train of claim 74, wherein:

the first clutch and the first brake are operated in a first forward speed, the second clutch and the first brake are operated in a second forward speed, the third clutch and the first brake are operated in a third forward speed, the fourth clutch and the first brake are operated in a fourth forward speed, the third and fourth clutches are operated in a fifth forward speed, the second and fourth clutches are operated in a sixth forward speed, the first and fourth clutches are operated in a seventh forward speed, the first clutch and the second brake are operated in a first reverse speed, the second clutch and the second brake are operated in a second reverse speed, and the third clutch and the second brake are operated in a third reverse speed.

80. The power train of claim 54, wherein the output unit comprises:

a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third ring gear is fixedly connected to the fourth planet carrier, the third planet carrier is fixedly connected to the fourth ring gear, the third sun gear is operated as the variable input member, at least one of the fixedly connected third planet carrier and the fourth ring gear is operated as the variable input/stopped member, the fourth sun gear is operated as the variably stopped member, and at least one of the fixedly connected third ring gear and the fourth planet carrier is operated as the shift speed output member.

81. The power train of claim 80, wherein the first clutch is disposed on an opposite side to the output unit with reference to the speed shift unit.

82. The power train of claim 80, wherein the second, third, and fourth clutches are disposed between the speed shift unit and the output unit.

83. The power train of claim 80, wherein the first brake is disposed on an opposite side to the speed shift unit with reference to the output unit.

84. The power train of claim 80, wherein the first, second, third, and fourth planetary gear sets are disposed in a sequence of the first planetary gear set, the second planetary gear set, the third planetary gear set, and the fourth planetary gear set.

85. The power train of claim 80, wherein:

the first clutch and the first brake are operated in a first forward speed, the second clutch and the first brake are operated in a second forward speed, the third clutch and the first brake are operated in a third forward speed, the fourth clutch and the first brake are operated in a fourth forward speed, the third and fourth clutches are operated in a fifth forward speed, the second and fourth clutches are operated in a sixth forward speed, the first and fourth clutches are operated in a seventh forward speed, the first clutch and the second brake are operated in a first reverse speed, the second clutch and the second brake are operated in a second reverse speed, and the third clutch and the second brake are operated in a third reverse speed.

86. The power train of claim 54, wherein the output unit comprises:

a third planetary gear set having a third sun gear, a third planet carrier, and a third ring gear as operational members thereof; and a fourth planetary gear set having a fourth sun gear, a fourth planet carrier, and a fourth ring gear as operational members thereof, wherein the third sun gear is fixedly connected to the fourth sun gear, the third planet carrier is fixedly connected to the fourth ring gear, the third ring gear is operated as the variable input member, at least one of the fixedly connected third planet carrier and the fourth ring gear is operated as the variable input/stopped member, at least one of the fixedly connected third sun gear and the fourth sun gear is operated as the variably stopped member, and the fourth planet carrier is operated as the shift speed output member.

87. The power train of claim 86, wherein the first clutch is disposed on an opposite side to the output unit with reference to the speed shift unit.

88. The power train of claim 86, wherein the second, third, and fourth clutches are disposed between the speed shift unit and the output unit.

89. The power train of claim 86, wherein the first and second brakes are disposed between the third planetary gear set and the fourth planetary gear set.

90. The power train of claim 86, wherein the first, second, third, and fourth planetary gear sets are disposed in a sequence of the first planetary gear set, the second planetary gear set, the third planetary gear set, and the fourth planetary gear set.

91. The power train of claim 86, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

92. The power train of claim 67, wherein the output unit comprises:
a first planetary gear set having a first sun gear, a first planet carrier, and a first ring gear as operational members thereof; and
a second planetary gear set having a second sun gear, a second planet carrier, and a second ring gear as operational members thereof,
wherein the first sun gear is fixedly connected to the second sun gear,
the first planet carrier is fixedly connected to the second ring gear,
the first ring gear is operated as the variable input member,
at least one of the fixedly connected first planet carrier and the second ring gear is operated as the variable input/stopped member,
at least one of the fixedly connected first sun gear and the second sun gear is operated as the variably stopped member, and
the second planet carrier is operated as the shift speed output member.

93. The power train of claim 92, wherein the first clutch is disposed on an opposite side to the output unit with reference to the speed shift unit.

94. The power train of claim 92, wherein the second, third, and fourth clutches are disposed between the speed shift unit and the output unit.

95. The power train of claim 92, wherein the first and second brakes are disposed between the first planetary gear set and the second planetary gear set.

96. The power train of claim 92, wherein the Ravigneaux planetary gear set and the first and second planetary gear sets are disposed in a sequence of the Ravigneaux planetary gear set, the first planetary gear set, and the second planetary gear set.

97. The power train of claim 92, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

98. The power train of claim 16, wherein the output unit comprises:
a first planetary gear set having a first sun gear, a first planet carrier, and a first ring gear as operational members thereof; and
a second planetary gear set having a second sun gear, a second planet carrier, and a second ring gear as operational members thereof,
wherein the first sun gear is fixedly connected to the second sun gear,
the first planet carrier is fixedly connected to the second ring gear,
the first ring gear is operated as the variable input member,
at least one of the fixedly connected first planet carrier and the second ring gear is operated as the variable input/stopped member,
at least one of the fixedly connected first sun gear and the second sun gear is operated as the variably stopped member, and
the second planet carrier is operated as the shift speed output member.

99. The power train of claim 98, wherein the first clutch is disposed on an opposite side to the output unit with reference to the speed shift unit.

100. The power train of claim 98, wherein the second, third, and fourth clutches are disposed between the speed shift unit and the output unit.

101. The power train of claim 98, wherein the first and second brakes are disposed between the first planetary gear set and the second planetary gear set.

102. The power train of claim 98, wherein the compound planetary gear set and the first and second planetary gear sets are disposed in a sequence of the compound planetary gear set, the first planetary gear set, and the second planetary gear set.

103. The power train of claim 98, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

104. The power train of claim 2, wherein the output unit comprises:
a third planetary gear set having a third sun gear, a third planet carrier, and a third ring gear as operational members thereof; and
a fourth planetary gear set having a fourth sun gear, a fourth planet carrier, and a fourth ring gear as operational members thereof,
wherein the third sun gear is fixedly connected to the fourth sun gear,
the third planet carrier is fixedly connected to the fourth ring gear,
the third ring gear is operated as the variable input member,
at least one of the fixedly connected third planet carrier and the fourth ring gear is operated as the variable input/stopped member,
at least one of the fixedly connected third sun gear and the fourth sun gear is operated as the variably stopped member, and
the fourth planet carrier is operated as the shift speed output member.

105. The power train of claim 104, wherein the first clutch is disposed on an opposite side to the output unit with reference to the speed shift unit.

106. The power train of claim 104, wherein the second, third, and fourth clutches are disposed between the speed shift unit and the output unit.

107. The power train of claim 104, wherein the first and second brakes are disposed between the third planetary gear set and the fourth planetary gear set.

108. The power train of claim 104, wherein the first, second, third, and fourth planetary gear sets are disposed in a sequence of the first planetary gear set, the second planetary gear set, the third planetary gear set, and the fourth planetary gear set.

109. The power train of claim 104, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

110. The power train of claim 54, wherein the output unit comprises a Ravigneaux planetary gear set having a long-pinion-side sun gear, a short-pinion-side sun gear, a Ravigneaux planet carrier, and a Ravigneaux ring gear as operational members thereof,
wherein the long-pinion-side sun gear is operated as the variable input member,
the Ravigneaux planet carrier is operated as the variable input/stopped member,
the short-pinion-side sun gear is operated as the variably stopped member, and
the Ravigneaux ring gear is operated as the shift speed output member.

111. The power train of claim 110, wherein the first clutch is disposed on an opposite side to the output unit with reference to the speed shift unit.

112. The power train of claim 110, wherein the second, third, and fourth clutches are disposed between the speed shift unit and the output unit.

113. The power train of claim 110, wherein the first and second brakes are disposed between the speed shift unit and the output unit.

114. The power train of claim 110, wherein the first and second planetary gear sets and the Ravigneaux planetary gear set are disposed in a sequence of the first planetary gear set, the second planetary gear set, and the Ravigneaux planetary gear set.

115. The power train of claim 110, wherein:
the first clutch and the first brake are operated in a first forward speed,
the second clutch and the first brake are operated in a second forward speed,
the third clutch and the first brake are operated in a third forward speed,
the fourth clutch and the first brake are operated in a fourth forward speed,
the third and fourth clutches are operated in a fifth forward speed,
the second and fourth clutches are operated in a sixth forward speed,
the first and fourth clutches are operated in a seventh forward speed,
the first clutch and the second brake are operated in a first reverse speed,
the second clutch and the second brake are operated in a second reverse speed, and
the third clutch and the second brake are operated in a third reverse speed.

116. The power train of claim 1, wherein the speed shift unit comprises a first Ravigneaux planetary gear set having a first long-pinion-side sun gear, a first short-pinion-side sun gear, a first Ravigneaux planet carrier, and a first Ravigneaux ring gear as operational members thereof, wherein the first Ravigneaux planet carrier is operated as the fixed input member, the first short-pinion-side sun gear is operated as the fixedly stopped member, the first Ravigneaux ring gear is operated as the reduced speed output member, and the first long-pinion-side sun gear is operated as the increased speed output member.

117. The power train of claim 116, wherein the output unit comprises a second Ravigneaux planetary gear set having a second long-pinion-side sun gear, a second short-pinion-side sun gear, a second Ravigneaux planet carrier, and a second Ravigneaux ring gear as operational members thereof, wherein the second long-pinion-side sun gear is operated as the variable input member, the second Ravigneaux planet carrier is operated as the variable input/stopped member, the second short-pinion-side sun gear is operated as the variably stopped member, and the second Ravigneaux ring gear is operated as the shift speed output member.

118. The power train of claim 117, wherein the first clutch is disposed on an opposite side to the output unit with reference to the speed shift unit.

119. The power train of claim 117, wherein the second, third, and fourth clutches are disposed between the speed shift unit and the output unit.

120. The power train of claim 117, wherein the first and second brakes are disposed between the speed shift unit and the output unit.

121. The power train of claim 117, wherein the first and second Ravigneaux planetary gear sets are disposed in a sequence of the first Ravigneaux planetary gear set and the second Ravigneaux planetary gear set.

122. The power train of claim 117, wherein:

the first clutch and the first brake are operated in a first forward speed, the second clutch and the first brake are operated in a second forward speed, the third clutch and the first brake are operated in a third forward speed, the fourth clutch and the first brake are operated in a fourth forward speed, the third and fourth clutches are operated in a fifth forward speed, the second and fourth clutches are operated in a sixth forward speed, the first and fourth clutches are operated in a seventh forward speed, the first clutch and the second brake are operated in a first reverse speed, the second clutch and the second brake are operated in a second reverse speed, and the third clutch and the second brake are operated in a third reverse speed.

123. The power train of claim 1, wherein the speed shift unit comprises a compound planetary gear set having a long-pinion-side ring gear, a short-pinion-side ring gear, a compound planet carrier, and a compound sun gear as operational members thereof, wherein the compound planet carrier is operated as the fixed input member, the compound sun gear is operated as the fixedly stopped member, the short-pinion-side ring gear is operated as the reduced speed output member, and the long-pinion-side ring gear is operated as the increased speed output member.

124. The power train of claim 123, wherein the output unit comprises a Ravigneaux planetary gear set having a long-pinion-side sun gear, a short-pinion-side sun gear, a Ravigneaux planet carrier, and a Ravigneaux ring gear as operational members thereof, wherein the long-pinion-side sun gear is operated as the variable input member, the Ravigneaux planet carrier is operated as the variable input/stopped member, the short-pinion-side sun gear is operated as the variably stopped member, and the Ravigneaux ring gear is operated as the shift speed output member.

125. The power train of claim 124, wherein the first clutch is disposed on an opposite side to the output unit with reference to the speed shift unit.

126. The power train of claim 124, wherein the second, third, and fourth clutches are disposed between the speed shift unit and the output unit.

127. The power train of claim 124, wherein the first and second brakes are disposed between the speed shift unit and the output unit.

128. The power train of claim 124, wherein the compound planetary gear set and the Ravigneaux planetary gear set are disposed in a sequence of the compound planetary gear set and the Ravigneaux planetary gear set.

129. The power train of claim 124, wherein:

the first clutch and the first brake are operated in a first forward speed, the second clutch and the first brake are operated in a second forward speed, the third clutch and the first brake are operated in a third forward speed, the fourth clutch and the first brake are operated in a fourth forward speed, the third and fourth clutches are operated in a fifth forward speed, the second and fourth clutches are operated in a sixth forward speed, the first and fourth clutches are operated in a seventh forward speed, the first clutch and the second brake are operated in a first reverse speed, the second clutch and the second brake are operated in a second reverse speed, and the third clutch and the second brake are operated in a third reverse speed.

\* \* \* \* \*